Dec. 26, 1950     C. J. GREEN ET AL     2,535,130
CAMSHAFT GRINDING MACHINE

Filed Oct. 19, 1948     13 Sheets-Sheet 1

Inventors
CLARENCE J. GREEN
OIVA E. HILL

By Harold W. Eaton
Attorney

Dec. 26, 1950     C. J. GREEN ET AL     2,535,130
CAMSHAFT GRINDING MACHINE
Filed Oct. 19, 1948     13 Sheets-Sheet 3
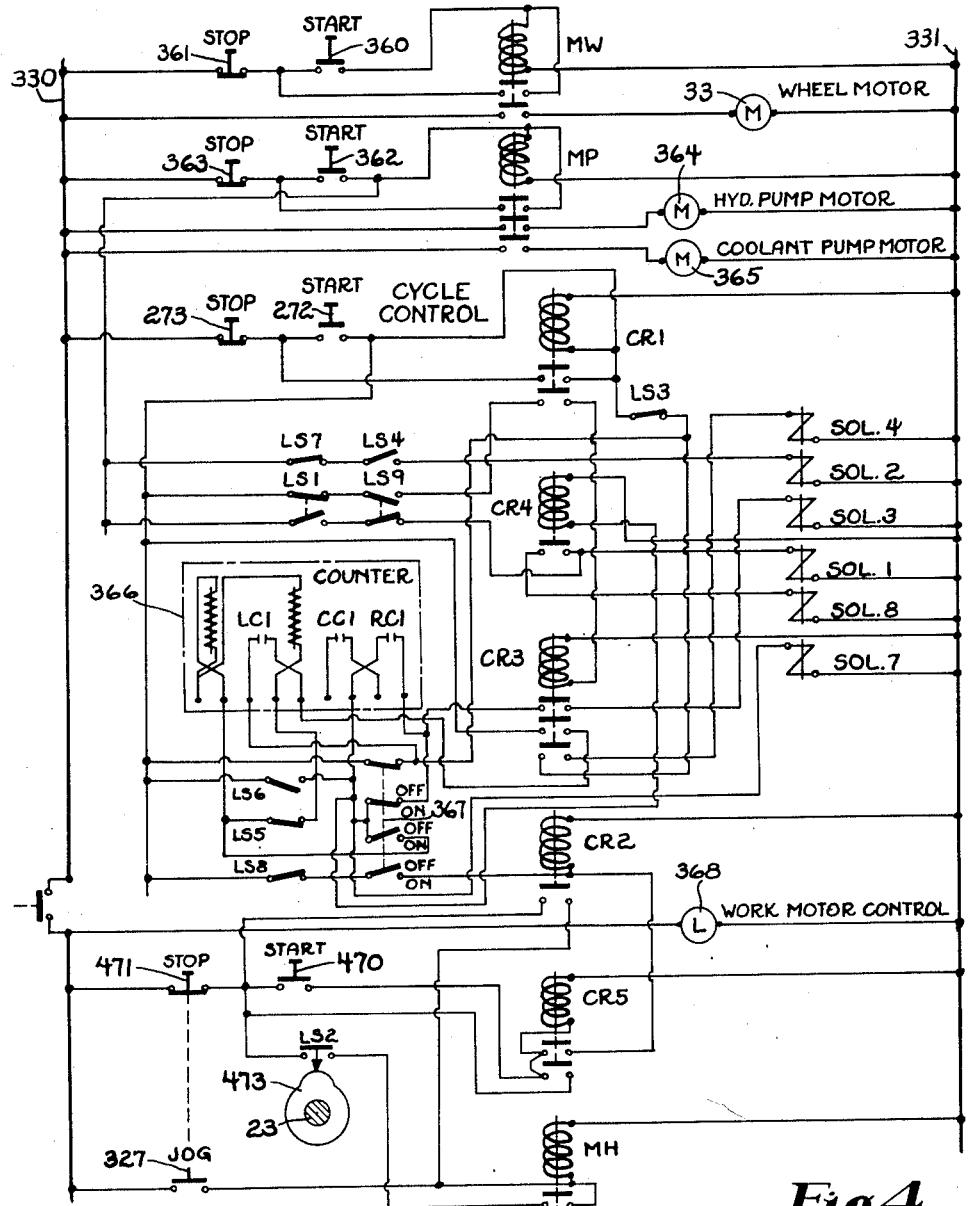
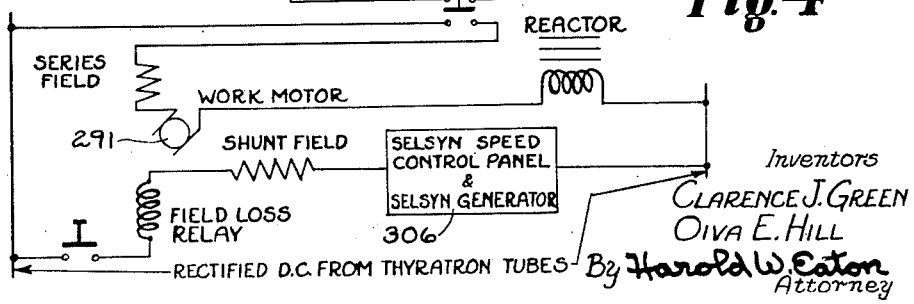
*Fig. 4*
Inventors
CLARENCE J. GREEN
OIVA E. HILL
By Harold W. Eaton
Attorney Dec. 26, 1950     C. J. GREEN ET AL     2,535,130
CAMSHAFT GRINDING MACHINE
Filed Oct. 19, 1948     13 Sheets-Sheet 4

Inventors
CLARENCE J. GREEN
OIVA E. HILL
By Harold W. Eaton
Attorney

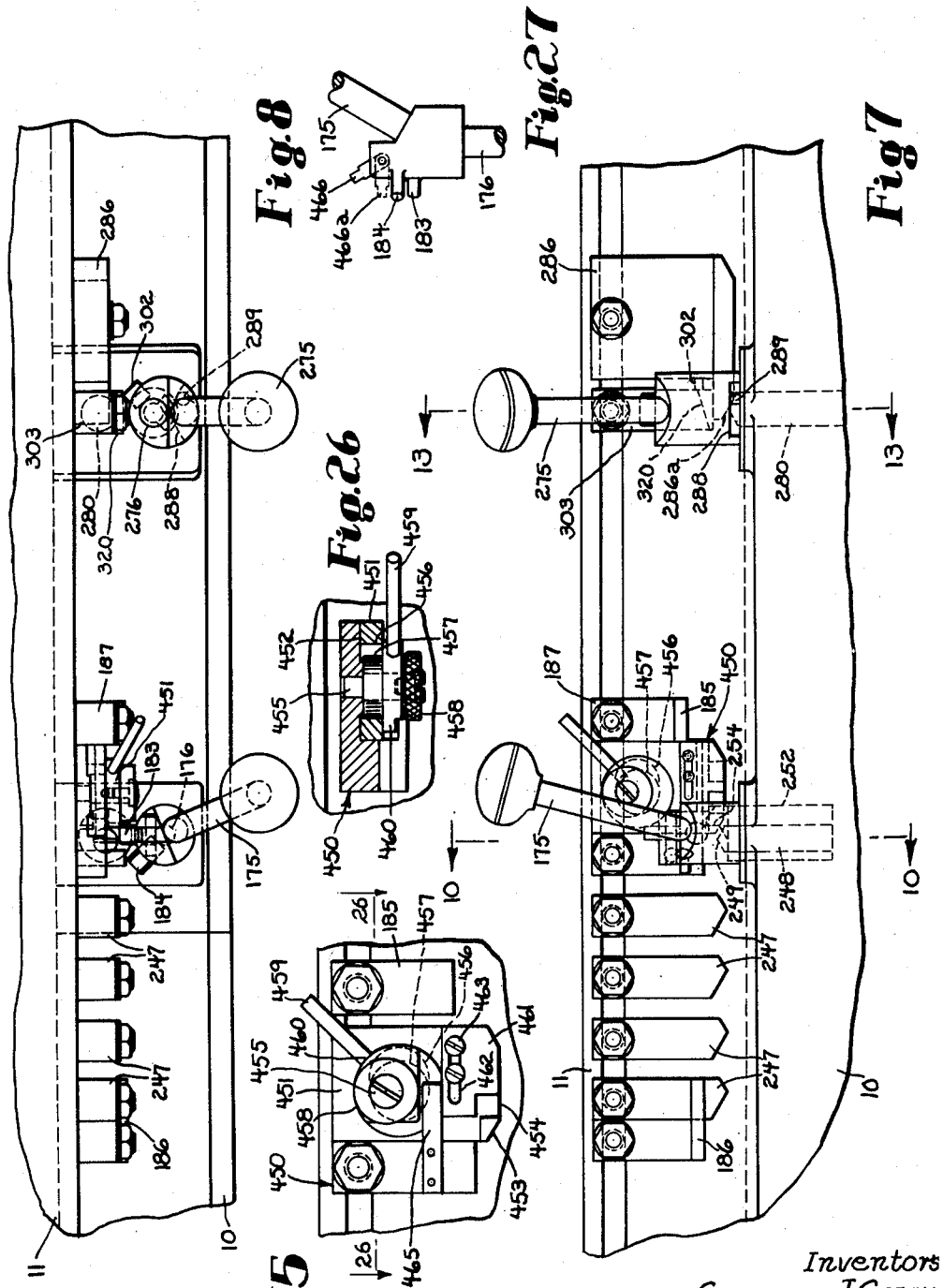

Dec. 26, 1950     C. J. GREEN ET AL     2,535,130
CAMSHAFT GRINDING MACHINE
Filed Oct. 19, 1948     13 Sheets-Sheet 6

Inventors
CLARENCE J. GREEN
OIVA E. HILL

By Harold W. Eaton
Attorney

Dec. 26, 1950 C. J. GREEN ET AL 2,535,130
CAMSHAFT GRINDING MACHINE
Filed Oct. 19, 1948 13 Sheets-Sheet 7
Fig.12
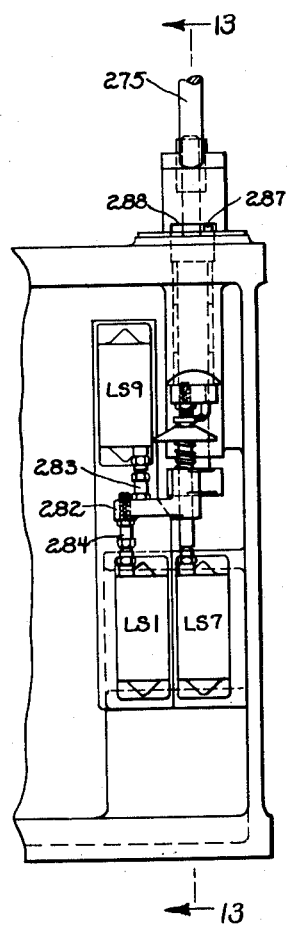
Fig.13
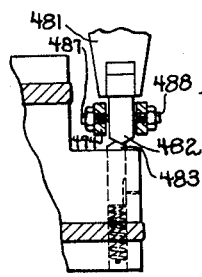
Fig.28
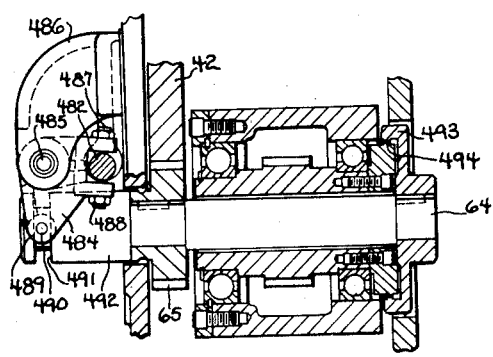
Fig.29
Inventors
CLARENCE J. GREEN
OIVA E. HILL
By Harold W. Eaton
Attorney Dec. 26, 1950  C. J. GREEN ET AL  2,535,130
CAMSHAFT GRINDING MACHINE
Filed Oct. 19, 1948  13 Sheets-Sheet 8

Inventors
CLARENCE J. GREEN
OIVA E. HILL

By Harold W. Eaton
Attorney

Dec. 26, 1950     C. J. GREEN ET AL     2,535,130
CAMSHAFT GRINDING MACHINE
Filed Oct. 19, 1948                    13 Sheets-Sheet 9
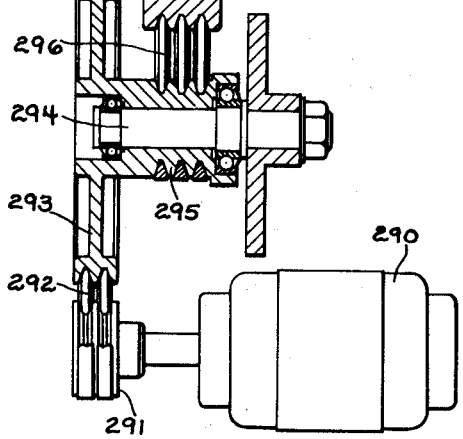
Fig.17
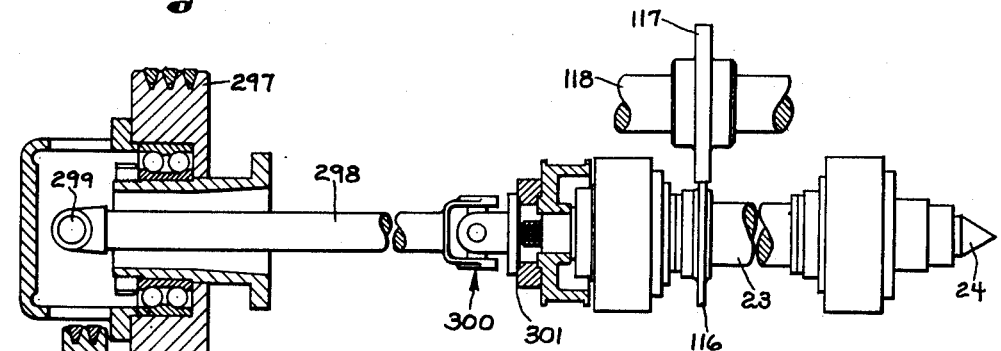
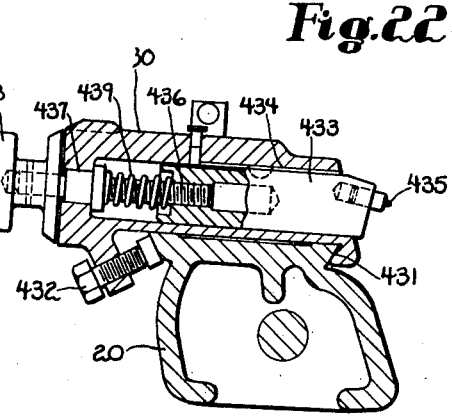
Fig.22
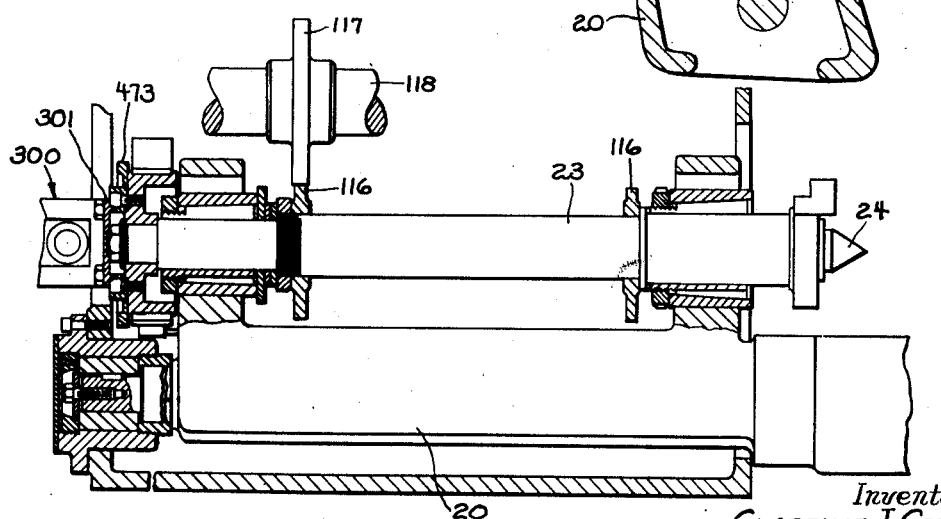
Fig.19
Inventors
CLARENCE J. GREEN
OIVA E. HILL
By Harold W. Eaton
Attorney Dec. 26, 1950  C. J. GREEN ET AL  2,535,130
CAMSHAFT GRINDING MACHINE
Filed Oct. 19, 1948  13 Sheets-Sheet 10

Inventors
CLARENCE J. GREEN
OIVA E. HILL
By Harold W. Eaton
Attorney

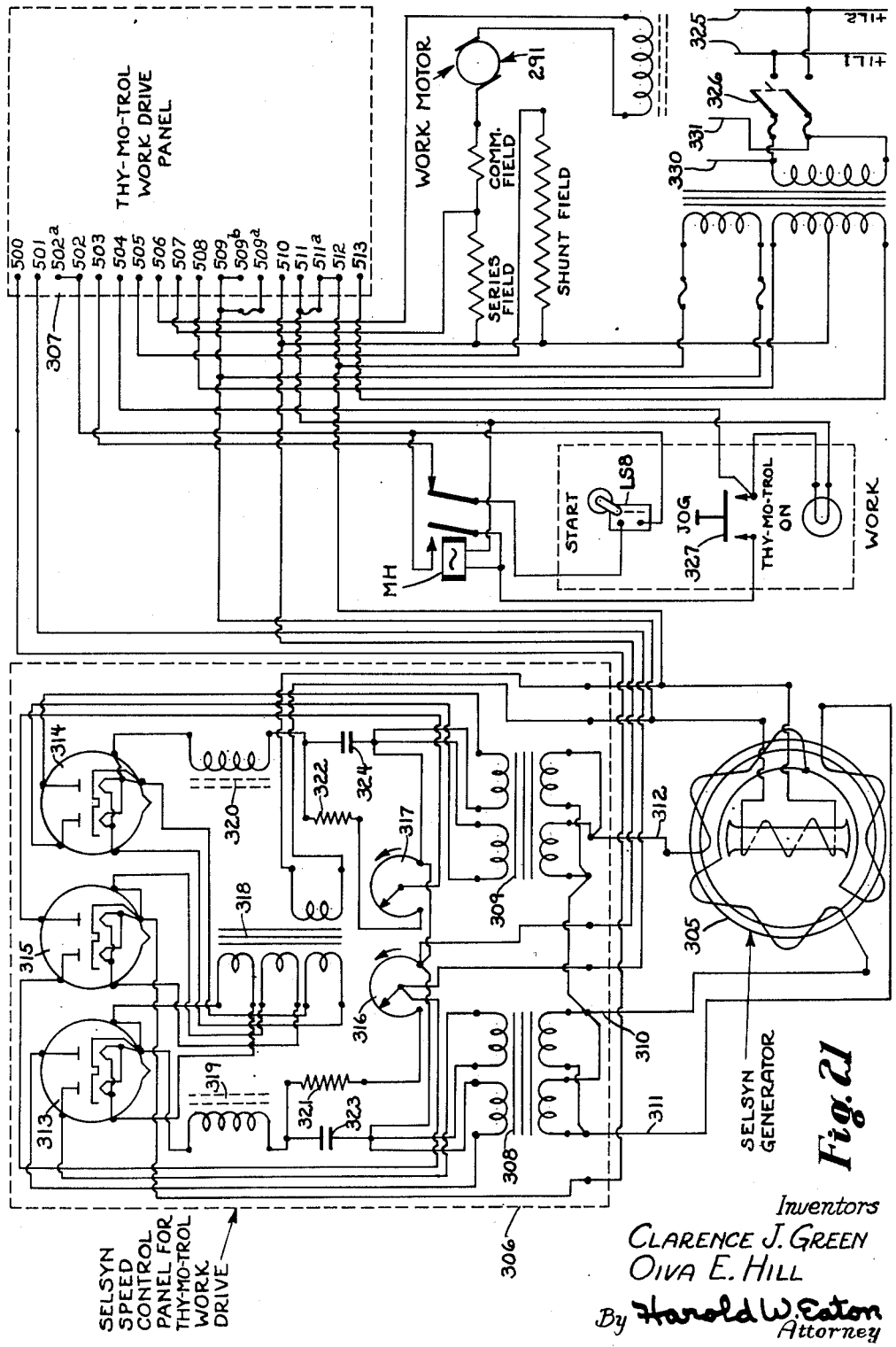

Dec. 26, 1950     C. J. GREEN ET AL     2,535,130
CAMSHAFT GRINDING MACHINE
Filed Oct. 19, 1948     13 Sheets-Sheet 12

Inventors
CLARENCE J. GREEN
OIVA E. HILL
By Harold W. Eaton
Attorney

Patented Dec. 26, 1950

2,535,130

UNITED STATES PATENT OFFICE 2,535,130

CAMSHAFT GRINDING MACHINE

Clarence J. Green and Olva E. Hill, Worcester, Mass., assignors to Norton Company, Worcester, Mass., a corporation of Massachusetts Application October 19, 1948, Serial No. 55,382

27 Claims. (Cl. 51—72)

The invention relates to grinding machines, and more particularly to a camshaft grinding machine.

One object of the invention is to provide a simple and thoroughly practical automatic camshaft grinding machine for grinding a plurality of cams on a camshaft. A further object is to provide a hydraulically actuated electrically controlled mechanism for producing an automatic cycle of operation. Another object is to provide a work drive mechanism automatically to produce a continuously changing work speed during a grinding operation. Another object is to provide a continuously diminishing work speed during a grinding operation.

Another object is to provide an automatic control for the work drive motor whereby rocking of the rock bar to and from an operative position serves to start and stop the motor. Another object is to provide a manually operable control for the work drive motor. Another object is to provide a selector control whereby either the manual or the automatic controls for the work drive motor may be rendered operative. Another object is to provide means for delay starting of the work motor until the master cam is about to engage the master cam roller.

Another object of the invention is to provide an automatic grinding wheel truing mechanism for automatically truing the grinding wheel after each camshaft has been ground. Another object is to provide an automatically actuated truing feed compensator automatically to advance the grinding wheel before each pass of the truing tool across the face of the grinding wheel. Another object is to provide means automatically to advance the grinding wheel feed mechanism parts to a finish grinding position during a truing operation. A further object is to provide means automatically to stop reciprocation of the grinding wheel spindle during a truing operation. Another object is to provide electric and hydraulic interlocks between the various mechanisms of the machine. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention:

Fig. 4 is an electrical diagram of the electrical controls of the machine;

Fig. 7 is a fragmentary front elevation, on an enlarged scale, of the table dogs and control levers;

Fig. 8 is a fragmentary plan view of the parts shown in Fig. 7;

Fig. 12 is a fragmentary front elevation, on an enlarged scale, of the main control lever and associated parts;

Fig. 13 is a vertical sectional view, taken approximately on the line 13—13 of Figs. 7 and 12;

Fig. 17 is a fragmentary view showing the drive for the master cam spindle;

Fig. 19 is a fragmentary plan view, on an enlarged scale, of the work head, showing the arrangement of the master cam spindle and the follower roller and associated parts;

Fig. 21 is an electrical diagram of the Selsyn generator controlled drive for the work drive motor;

Fig. 22 is a cross sectional view through the rock bar and the truing tool holder;

Fig. 25 is a front elevation, on an enlarged scale, of the truing dog;

Fig. 26 is a horizontal sectional view, taken approximately on the line 26—26 of Fig. 25, showing the vertical slide construction of the dog;

Fig. 27 is a fragmentary left hand side elevation, on an enlarged scale of the table reversing lever;

Fig. 28 is a horizontal sectional view, on an enlarged scale, through the feed screw clutch;

Fig. 29 is a fragmentary detail view of the spring actuated detent for positioning the clutch actuating lever.

Figure 1:
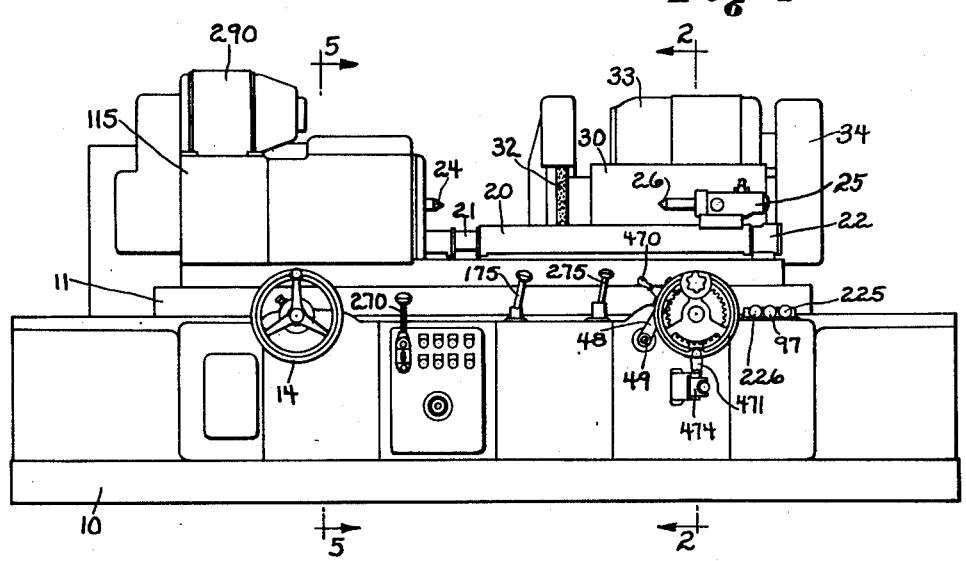
Fig. 1 is a front elevation of an automatic cam grinding machine embodying this invention.

An automatic cam grinding machine has been illustrated in the drawings having a base 10 which supports a longitudinally movable work table 11 on the usual flat way 12 and V-way 13. The table 11 is arranged so that it may be moved or traversed longitudinally by a manually operable traverse mechanism including a hand wheel 14. This traverse mechanism is substantially identical with that shown in the expired U. S. patent to C. H. Norton, No. 762,838 dated June 14, 1904, to which reference may be had for details of disclosure not contained herein.

The table 11 is arranged so that it may be traversed or indexed longitudinally by a power operated mechanism which as illustrated may comprise a hydraulic cylinder 16 which is fixedly supported on the underside of the table 11. The cylinder 16 contains a slidably mounted piston 17 which is connected to a double end piston rod 18. The hydraulic control mechanism for controlling the admission to and exhaust of fluid from the cylinder 16 will be described hereinafter.

The work table 11 serves as a support for a pivotally mounted rock bar 20 which is journalled in bearings 21 and 22 fixedly mounted on the table 11. The rock bar supports a rotatably mounted master cam spindle 23 having a headstock center 24 at its right hand end (Fig. 1). The rock bar 20 also supports a footstock 25 having a footstock center 26. The centers 24 and 26 serving to support a camshaft (not shown) having a plurality of integrally formed cams to be ground.

The base 10 also serves as a support for a transversely movable wheel slide 30 which is arranged to slide transversely on a flat way and V-way (not shown) formed on the base 10. The wheel slide 30 supports a rotatable wheel spindle 31 having a rotatable grinding wheel 32 mounted on its left hand end (Fig. 1). A motor driven mechanism is provided for driving the spindle 31 and the grinding wheel 32 comprising an electric motor 33 mounted on the upper face of the wheel slide 30. The motor 33 is connected by means of a V-belt drive (not shown) contained within a belt guard 34.

The wheel slide 30 is arranged for a transverse feeding movement to feed the grinding wheel 32 toward and from the cam to be ground. This mechanism may comprise a rotatable feed screw 35 having a forwardly extending cylindrical portion 36 which is slidably keyed within a rotatable sleeve 37. The sleeve 37 is journalled in an anti-friction bearing 38 and the rear end of the feed screw 35 is journalled in an anti-friction bearing 39 both of which are supported in fixed relationship with the base 10. A rotatable shaft 40 is slidably keyed within the sleeve 37 and is rotatably journalled in bearings 41. The forward end of the shaft 40 supports a gear 42 which meshes with a small gear 43. The small gear 43 is fixedly mounted relative to a large gear 44, both of which are rotatably supported on a fixed stud 45. A manually operable feed wheel 46 is connected to the gear 44 by means of a micrometer adjusting mechanism 47. A feed stop pawl 48 is pivotally supported by a stud 49 on the front of the base 10. The upper end of the pawl 48 is arranged to engage a stop abutment 50 which is fixedly supported by the feed wheel 46. It will be readily apparent from the foregoing disclosure that a rotary motion of the hand feed wheel 46 will be imparted through the gear mechanism above described to transmit a rotary motion to the feed screw 35. A nut 51 meshes with the feed screw 35 and is rotatably supported by anti-friction bearings 52 and 53 which are in turn supported by a bracket 54 depending from the underside of the wheel slide 30. A rotary motion of the feed screw 35 will be transmitted through the nut 51 to impart a transverse feeding movement to the wheel slide 30 and the grinding wheel 32.

A secondary feeding mechanism is provided to advance the grinding wheel for a grinding wheel truing operation. This mechanism is preferably independent of the manual mechanism previously described. A worm 56 is formed on the outer periphery of the nut 51. The worm 56 meshes with a worm gear 57 mounted on the lower end of a vertically arranged rotatable shaft 58. The shaft 58 is connected at its upper end to a compensating or secondary feeding mechanism 59 which will be more fully described hereinafter.

An automatically operated power actuated mechanism is provided for automatically rotating the feed screw 35 to impart an infeeding movement to the grinding wheel during a grinding operation. This mechanism is preferably a hydraulically operated mechanism comprising a cylinder 60 (Figs. 3 and 6) which contains a slidably mounted piston 61. The piston 61 is provided with rack teeth 62 which mesh with a gear 63 carried by a rotatable shaft 64. The shaft 64 also supports a gear 65 which meshes with the gear 42. When fluid under pressure is passed through a pipe 66 into a cylinder chamber 67 to cause the piston 61 to move toward the right, a rotary motion will be imparted through the gearing above described to rotate the feed wheel in a counter-clockwise direction so as to feed the grinding wheel 32 toward the camshaft 27 to be ground. During this infeeding movement, fluid within a cylinder chamber 68 may exhaust through a pipe 69. The infeeding movement of the hand wheel 46 continues until the stop abutment 50 engages the end of the stop pawl 48 which determines the final infeeding position of the grinding wheel.

To facilitate setting up the feeding mechanism of the machine when a new wheel is mounted thereon, to set up for different diameter work pieces, or to facilitate manual control of the wheel feed during a grinding operation, it is desirable to provide means for disconnecting the feed wheel 46 from the power actuated mechanism. This is preferably accomplished by means of a clutch mechanism whereby the fluid motor 60—61 may be disconnected from the feed wheel 46 and the feed screw 35. This mechanism may comprise a manually operable lever 480 which is rotatably supported in back of the feed wheel 46. The lever 480 is provided with a downwardly extending arm 481 having a cylindrical arrow-pointed end portion 482 which is arranged to engage a spring-pressed detent 483 which serves to hold the lever 480 in either a clutched or declutched position. A pivotally mounted bell crank lever 484 is supported on a vertical stud 485. The stud 485 is carried by a bracket 486 mounted on the front of the machine base 10. The bell crank lever 484 is provided with a yoked portion having a pair of opposed screws 487 and 488 which are arranged to engage diametrically opposite sides of the cylindrical arrow-pointed projection 482 (Fig. 29) of the arm 481. The bell crank lever 484 is also provided with a second yoked portion 489 which carries diametrically arranged studs 490. The studs 490 are arranged to engage a groove 491 formed in an enlarged sleeve 492 which is fixedly mounted on the forward end of the shaft 64. A clutch member 493 is carried to the inner end of the shaft 64. The clutch member 493 comprises an internal gear which is arranged to mesh with an external gear 494 of the main pitch diameter which is fixedly mounted relative to the gear 63 (Fig. 29). In the position shown in Fig. 29, the clutch members 493 and 494 are engaged so that movement of the piston 61 will be transmitted to the rack 62, the gear 63, the clutch parts 493—494, the shaft 64, the gear 65 to rotate the gear 42 which transmits a rotary feeding movement to the feed screw 35 and also to the feed wheel 46. If it is desired to declutch the piston 61 from the feed screw 35 and the feed wheel 46, the clutch lever 480 is rocked in a clockwise direction (Fig. 28) so as to move the shaft 64 toward the right (Fig. 28) thereby disengaging the clutch member 493 from the clutch member 494. In this position of the clutch parts, the feed wheel 46 may be manually rotated to rotate the feed screw 35 and thereby manually position the grinding wheel 32 as desired.

A fluid pressure system is provided for supplying fluid pressure to operate the piston 61 and other mechanisms of the machine comprising a motor driven fluid pump 75 which draws fluid through a pipe 76 from a reservoir 77 and passes fluid under pressure through a pipe 78 to the various mechanisms of the machine. A control valve 80 and a control valve 81 are provided to control the admission to and exhaust of fluid from the feed cylinder 60. The valve 80 is a shuttle type valve comprising a movable valve member 82 having a plurality of valve pistons formed integral therewith. The valve member 82 is arranged to be shifted by fluid under pressure controlled by a pilot valve 83 which is actuated by a solenoid S3. Fluid under pressure is passed through the pipe 78 to the valve 80 and also through the pipe 78 to the solenoid actuated pilot valve 83. In the position of the valve 83 (Fig. 3) fluid under pressure is admitted from the pilot valve 83 to an end chamber in the right hand end of the valve 80 to move the valve member 82 toward the left. A plurality of ports 84, 85, 86 and 87 are provided to control the passage of fluid through the valve 80 in a manner to be hereinafter described.

The valve 81 is similarly a shuttle type valve comprising a slidably mounted valve member 88 the movement of which is controlled by a pilot valve 89 actuated by a solenoid S8. Fluid under pressure is passed through a pipe 90 into a cylinder chamber formed at the right hand end of the valve 81 to shift the valve member 88 to its left hand end position. The valve 81 is provided with a plurality of ports 91, 92, 93 and 94.

Figure 3:
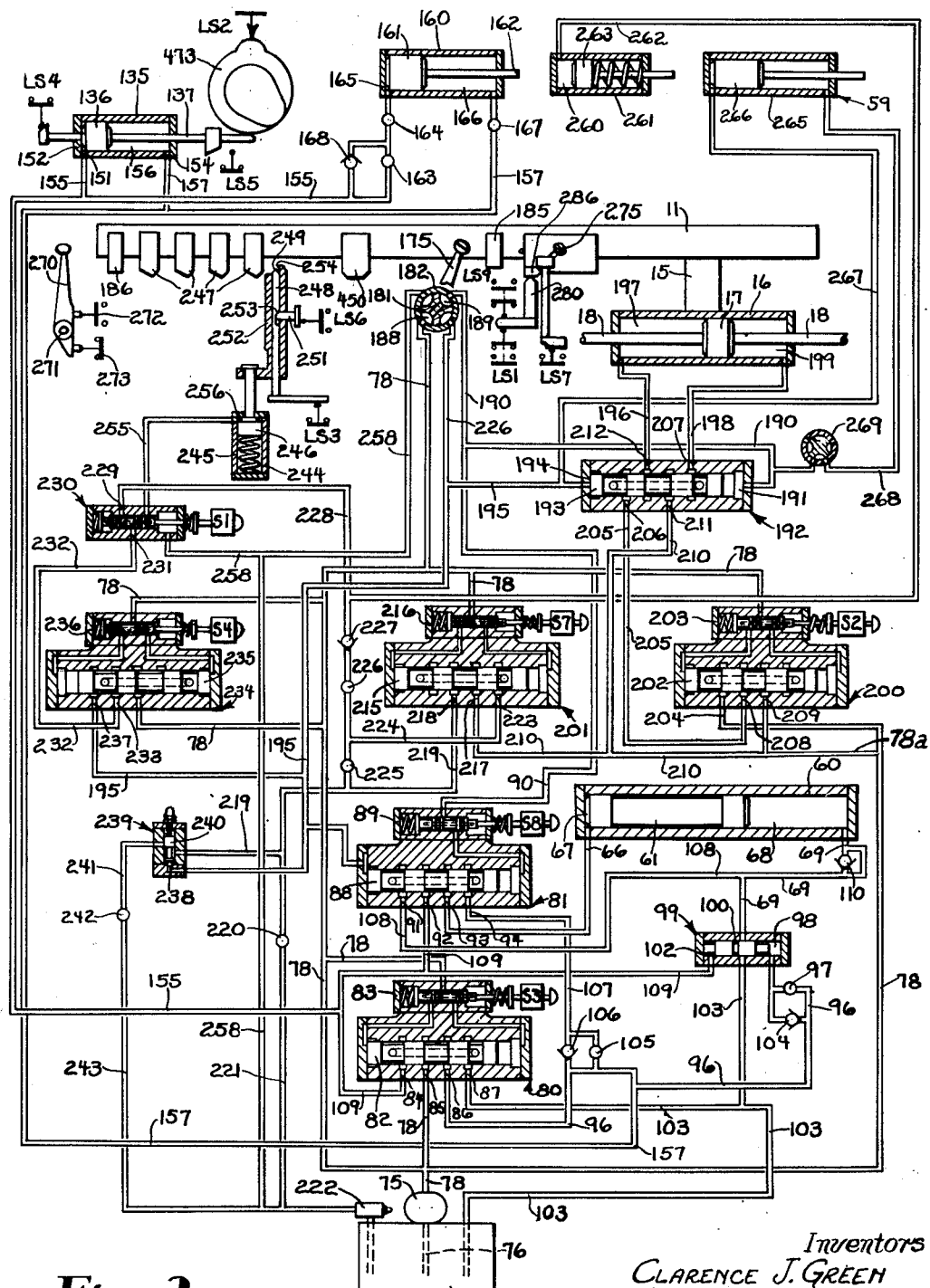
Fig. 3 is a hydraulic piping diagram.
Figure 11:
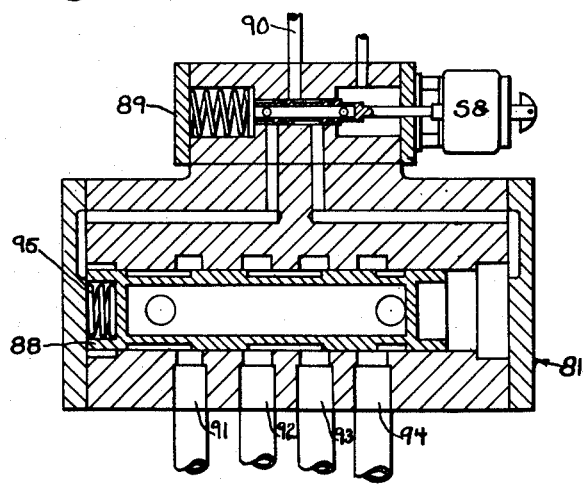
Fig. 11 is a longitudinal sectional view, on an enlarged scale, through one of the control valves.
Figure 14:
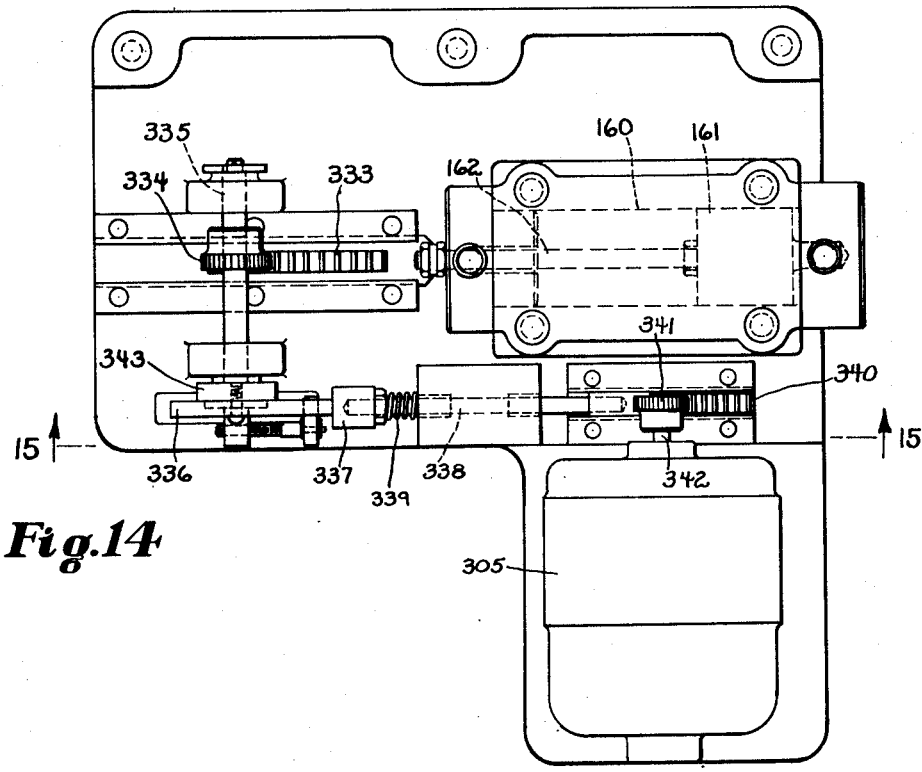
Fig. 14 is a fragmentary front elevation, on an enlarged scale, of the control apparatus for actuating the Selsyn generator for controlling the work speed.

Fig. 11 shows an enlarged view of the valve 81 to more clearly show the details of construction than on the small scale illustration shown in the diagram in Fig. 3. A compression spring 95 is provided for shifting the valve member 88 in a direction toward the right under certain conditions which will be hereinafter described. Except for the provision of the spring 95, the valve 81 is identical with the valve 80.

In the position of the valves 80 and 81 as illustrated in Fig. 3, fluid under pressure passing through the pipe 78, through the port 85 passes out through the port 86 and through a pipe 96 through a needle valve 97 into a right hand end chamber 98 formed in a backlash control valve 99. The backlash control valve 99 is a piston type valve comprising a pair of spaced pistons forming a valve chamber 100. During the initial infeeding movement of the grinding wheel, fluid exhausting from the cylinder chamber 68 exhausts through the pipe 69. During this exhaust of fluid from the cylinder 68 fluid under pressure is admitted through a pipe 109 into a left hand end chamber 102 of the backlash valve 99 to shift the valve toward the right at a rate controlled by the needle or throttle valve 97. During this shifting movement of the valve 99, the chamber 100 allows a predetermined amount of fluid to exhaust from the pipe 69 through the valve chamber 100 and out through an exhaust pipe 103 into the reservoir 77. The speed of movement of the valve 99 as controlled by the throttle valve 97 governs the amount of fluid permitted to exhaust from the pipe 69 through the valve chamber 100. This exhaust of fluid is in addition to the regular controlled exhaust of fluid from the cylinder chamber 68 and serves to provide an initial rapid movement of the piston 61 to take up backlash in the feeding mechanism. A ball check valve 104 is provided in the pipe line 96 so that when fluid under pressure is passed through the pipe 96 it may pass substantially unrestricted into the end chamber 98 to cause a rapid return movement of the valve 99 into its left hand end position.

Fluid under pressure passing through the pipe 96 also may pass through a throttle valve 105 which controls the normal rate of movement of the piston 61 in a manner to be hereinafter described. Fluid under pressure passing through the pipe 96 may also open a ball check valve 106 and pass substantially unrestricted through a pipe 107, through a port 94 in the valve 81. Fluid entering through the port 94 passes through a central aperture in the slidable valve member 88 and passes out through the port 91, through a pipe 108, through the pipe 69 into the cylinder chamber 68 to cause the piston 61 to move toward the left. The movement of the piston 61 toward the left serves through the gear mechanism previously described to rotate the feed wheel 46 and the feed screw 35 to move the grinding wheel 32 and its supporting wheel slide 30 rearwardly to an inoperative position. During the movement of the piston 61 toward the left, fluid exhausting through the pipe 66 from the valve chamber 67 enters a port 93 in the valve 81 and passes out through the port 82, through a pipe 108, through the port 84 in the valve 80, through a pipe 106, through the port 86 in the valve 80, through a central passage in the valve member 82, out through the port 87 and through the exhaust pipe 103 into the reservoir 77.

Assuming the solenoid S3 to be energized and the solenoid S8 deenergized, the pilot valve 83 will be shifted toward the left to admit fluid to a left hand end chamber to shift the slidable valve member 82 toward the right so that fluid under pressure passing through the pipe 78 will pass through pipe 108, through the port 82 in the valve 81, out through the port 93, through the pipe 66 into the cylinder chamber 67 to cause the piston 61 to move toward the right to initiate an infeeding movement of the grinding wheel 32. Fluid under pressure passing through the pipe 108 also passes through the pipe 101 into valve chamber 102 of the backlash valve 99 to move the valve 99 toward the right at a speed controlled by the throttle valve 97. The passing of the valve chamber 100 over the port at the end of the pipe 69 allows a predetermined volume of fluid to exhaust from the cylinder chamber 68 rapidly to take up the backlashing in the feeding mechanism after which continued exhaust of fluid through the pipe 69 passes through pipe 108, the port 91 of the valve 81 through a central aperture in the valve member 88, out through a port 94, through the pipe 107, through the throttle valve 105, the pipe 96, the port 86 of the valve 80 and out through the port 87 and the pipe 103 into the reservoir 70. A ball check valve 110 is provided in the pipe line 69 to allow substantially unrestricted flow of fluid through the pipe 69 into a cylinder chamber 68. It will thus be readily apparent from the foregoing disclosure that the infeeding movement of the grinding wheel is controlled by valves 80 and 81. The rate of infeeding movement being controlled by the throttle valve 105 and the rate and duration of the backlash take-up being controlled by the throttle valve 97.

The left hand end of the rock bar 20 supporting the master cam spindle 23 is supported within a headstock housing 115. The master cam spindle 23 supports a plurality of master cams 116, one master cam for each cam on the camshaft to be ground. A rotatable slidably mounted master cam roller 117 is supported on a rotatable shaft 118 which is in turn supported in bearings formed in the headstock housing 115. During a grinding operation the master cam 116 is maintained in operative engagement with the master cam follower roller 117 by a yieldable means to be hereinafter described so that as the master cam spindle 23 is rotated, the master cam 116 will rotate against the follower roller 117 which will impart a controlled rocking movement to the rock bar 20 so as to generate a predetermined contour on the cam being ground.

Figures 5, 6:
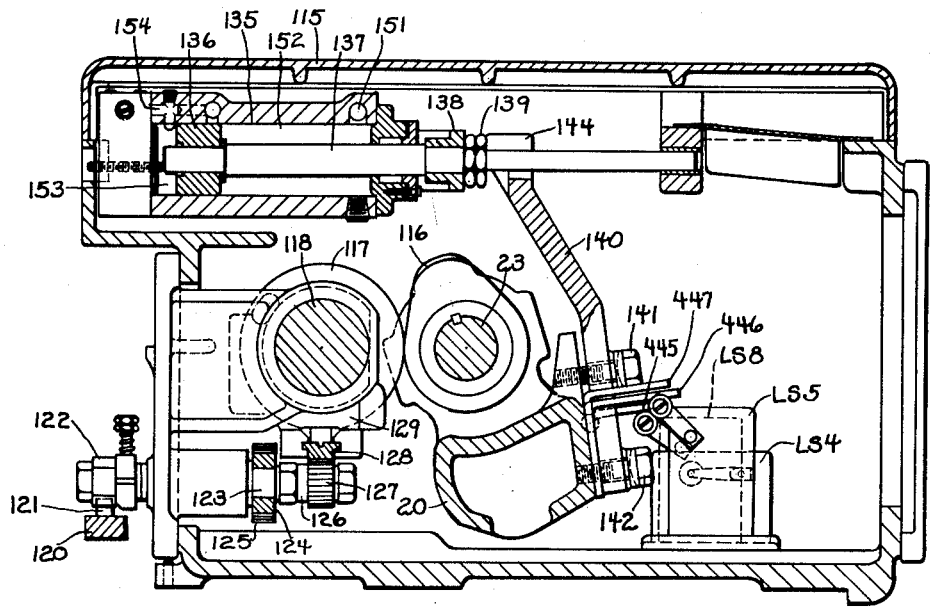
Fig. 5 is a vertical transverse section, on an enlarged scale, taken approximately on the line 5—5 of Fig. 1, through the rock bar showing the actuating mechanism for the rock bar and the electric switches actuated thereby.
Fig. 6 is a fragmentary view, on an enlarged scale, of the wheel feeding mechanism.
Figure 18:
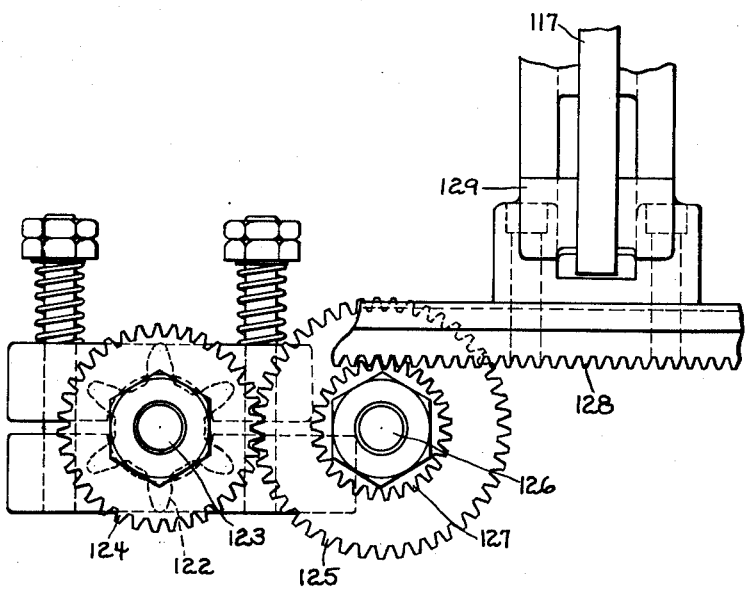
Fig. 18 is a fragmentary detailed view of a portion of the master cam roller indexing mechanism, showing the dog bar and star wheel.

An indexing mechanism is provided for automatically indexing the master cam roller 117 longitudinally on the shaft in timed relation with the longitudinal indexing movement of the table 11 to position the follower roller 117 opposite the master cam corresponding to the cam on the camshaft 27 to be ground. This indexing mechanism may comprise a dog bar 120 which is fixedly mounted relative to the base 10. The dog bar 120 is provided with a plurality of adjustably mounted dogs 121 which are arranged in the path of a star wheel 122 (Figs. 5 and 18).

The star wheel 122 is mounted on the end of a rotatable shaft 123 the inner end of which supports a gear 124. The gear 124 meshes with a gear 125 which is mounted on a rotatable shaft 126. The shaft 126 also supports a gear 127 which meshes with a rack bar 128 fixedly mounted on a yoked member 129 which engages the side faces of the master cam roller 117. This mechanism for indexing the master cam roller 117 is substantially identical with the mechanisms shown in the prior U. S. Patent No.1,783,755 to Trefethen and Belden dated December 2, 1930, and also U. S. Patent No. 2,022,178 to Belden and Silven dated November 26, 1935, to which reference may be had for details of disclosure not contained herein. It will be readily apparent from the foregoing disclosure that when the table 11 is indexed longitudinally to position successive cams on the camshaft 27 to be ground, an indexing movement will be imparted to index the master cam roller 117 longitudinally automatically to position the roller 117 in operative relation with the corresponding master cam 116.

Figure 20:
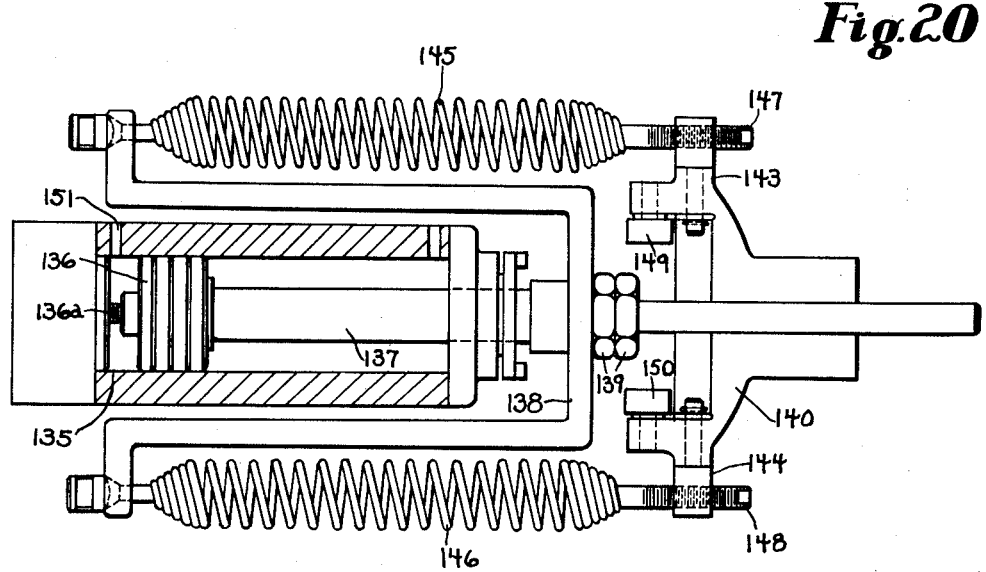
Fig. 20 is a fragmentary detailed view of the piston and cylinder and springs for actuating the rock bar.

A fluid pressure mechanism comprising a cylinder 135 and a piston 136 is provided for rocking the rock bar 20 to and from an operative position. It is desirable to rock the bar 20 to an inoperative position so as to separate the master cam 116 from the follower roller 117 before the table 11 is indexed longitudinally. The piston 136 is connected to one end of a piston rod 137. A U-shaped frame 138 is clamped in a fixed position on the piston rod 137 by means of nuts 139 (Figs. 5 and 20). An upwardly extending arm 140 is fixedly mounted on the rock bar 20 by means of screws 141 and 142. The upper end of the arm 140 is provided with a pair of horizontally extending arms 143 and 144. A pair of tension springs 145 and 146 are connected at one end to the opposite ends of the U-shaped frame 138. The other ends of the springs 145 and 146 are connected by screws 147 and 148 to the arms 143 and 144 respectively. By adjusting the screws 147 and 148, the tension of the springs 145 and 146 may be varied as desired. The arms 143 and 144 of the arm 140 are provided with rollers 149 and 150 respectively which are arranged to be engaged by the U-shaped frame 138 when the piston 136 is moved toward the right (Fig. 5). When fluid under pressure is admitted through a port 151 into a cylinder chamber 152 to move the piston 136 toward the right, the U-shaped frame 138 will be moved into engagement with the rollers 149 and 150 after which continued movement of the piston 136 toward the right will swing the arm 140 in a clockwise direction to impart a clockwise movement to the rock bar 20 thereby separating the master cam 116 from the follower roller 117. During this movement of the piston 136, fluid is exhausted from a cylinder chamber 153 through a port 154. The screws 147 and 148 are preferably adjusted so that when the piston 136 is in its extreme left hand end position, the tension of the springs 145 and 146 will be sufficient to maintain the master cam 116 in operative engagement with the periphery of the follower roller 117 during rotation of the master cam spindle 23 so as to impart a controlled rocking movement to the rock bar 20 during a cam grinding operation.

As the piston 136 moves toward the right (Fig. 20), to shift the rock bar 20 to an inoperative position, the U-shaped frame 138 moves toward the right and due to the clearance between the frame 138 and the rollers 149 and 150 relieves the tension on the springs 145 and 146. During movement of the piston 136 and frame 138 toward the right, the frame 138 engages the rollers 149 and 150 and rocks the arm 140 and rock bar 20 to an inoperative position. By utilizing this construction, the extending and contracting of the springs 145 and 146 is reduced to a minimum. During movement of the piston 136 toward the left (Fig. 20), the cam 116 engages the follower roller 117 (Fig. 5) after which the continued movement of the frame 138 toward the left separates the frame 138 from the rollers 149 and 150 and increases the tension on the springs 145 and 146 to the desired operating tension. The movement of the piston 136 toward the left continued until the piston 136 engages an adjustable stop screw 136a (Fig. 20).

When the solenoid S3 of the valve 80 is energized to shift the valve member 82 to the right so as to pass fluid under pressure through the pipe 109 to the valve 81, fluid is also passed through a pipe 155, through the port 151, into the cylinder chamber 152 to rock the rock bar 20 to an inoperative position. At the same time fluid under pressure is passed to the cylinder chamber 68 of the feed cylinder 60 so that when the grinding wheel is moved to a rearward or inoperative position, the rock bar is also rocked to an inoperative position to separate the master cam 116 from the follower roller 117 a sufficient distance so that it is unnecessary to back off the grinding wheel beyond the feed stroke before the next table indexing movement. This separation also serves to facilitate loading and unloading of camshafts. During admission of fluid to the cylinder chamber 152, fluid is exhausted from a cylinder chamber 156 through the port 154, through a pipe 157, through the valve 80 and the exhaust pipe 103 into the reservoir 77.

Similarly, when the valve 80 is in the position illustrated in Fig. 3, fluid under pressure passing from the valve 80 through the pipe 96 passes through the pipe 157 into the cylinder chamber 156 to move the piston 136 toward the left (Fig. 3) to move the rock bar 20 in a counter-clockwise direction to bring the master cam 116 into operative engagement with the follower roller 117.

A fluid pressure cylinder 160 and a piston 161 are provided for controlling the speed of the work driving motor so as to produce a continuously changing work speed during a grinding operation in a manner to be hereinafter described. The piston 161 is connected to a piston rod 162. When fluid under pressure is passed through the pipe 155, it passes through a throttle valve 163, through a second throttle valve 164 into a cylinder chamber 165 to cause the piston 161 to move toward the right. During this movement of the piston 161, fluid within a cylinder chamber 166 is exhausted through a throttle valve 167, through the pipe 157, through the valve 80 and through the pipe 103 into the reservoir 77. A ball check valve 168 is provided so that fluid exhausting from the cylinder chamber 165 may pass through the ball check valve 168 thus bypassing the throttle valve 163 so as to allow a rapid return movement of the piston 161 as it moves toward the left. It will be readily apparent from the foregoing disclosure that movement of the valve 80 serves not only to control the passage of fluid to the feed cylinder 60 but also serves to pass fluid to and from the rock bar cylinder 135 and also to the work speed control cylinder 160.

Figure 10:
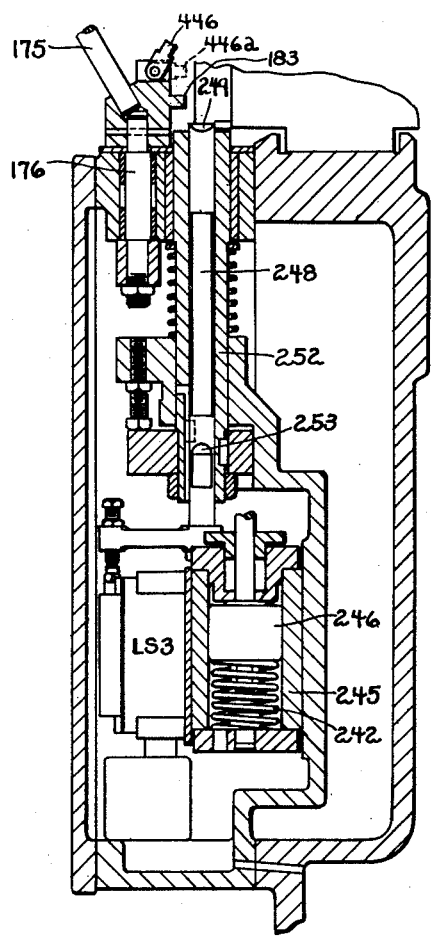
Fig. 10 is a vertical sectional view, taken approximately on the line 10—10 of Figs. 7 and 9.

A suitable control mechanism is provided for automatically controlling the flow of fluid to and from the table cylinder 16 so that the table may be automatically indexed longitudinally. This mechanism may comprise a reversing lever 175 which is mounted on the upper end of a vertical shaft 176. The lower end of the shaft 176 is provided with an integrally formed rock arm 177 which is connected by means of a stud 178 with a link arm 179. The other end of the link 179 is connected by a stud 180 with the rotor 181 of a reversing valve 182. The reversing lever 175 is provided with a pair of projecting offset lugs 183 and 184 (Figs. 10 and 27) which are arranged to be engaged by reversing dogs 185 and 186 respectively. As the table 11 moves longitudinally, one or the other of the reversing dogs 185 or 186 will engage the lugs 183 or 184 respectively and rock the vertical shaft 176 so as to impart a rotary motion to the valve rotor 181 to change the direction of flow of fluid to the table cylinder. A spring actuated load and fire mechanism comprising a spring 187 is provided for rapidly snapping the reversing valve into its reverse position. As shown diagrammatically in Fig. 3, the reversing lever 175 is shown directly adjacent to the reversing valve 182. Fluid under pressure from the pump passing through the pipe 78 enters a chamber 188 and passes through the valve rotor to a chamber 189, through a pipe 190 into a right hand end chamber 191 of a shuttle valve 192 to move the slidably mounted valve member 193 toward the left. During the movement of the valve member 193 toward the left, fluid within a left hand end chamber 194 in the valve 192 may exhaust through a pipe 195 in a manner to be hereinafter described. Fluid may pass from the valve 192 through a pipe 196 into a cylinder chamber 197 formed in the left hand end of the cylinder 16 or may pass through a pipe 198 into a cylinder chamber 199 formed at the right hand end of the cylinder 16. The shuttle type valve 192 serves as a reversing valve to change the direction of flow of fluid through the pipes 196 and 197 to change the direction of movement of the table 11. A pair of control valves 200 and 201 are provided to control the admission to and exhaust of fluid from the shuttle valve 192. The control valves 200 and 201 are substantially identical with valves 80 and 81 and therefore have not been shown except diagrammatically in Fig. 3. The control valve 200 comprises a shuttle type slidably mounted valve member 202 and a pilot valve 203 which is actuated by a solenoid S2. Fluid under pressure from the pump passing through pipe 78 enters the pilot valve 203 and passes through a passage in the valve 200 into the right hand end chamber to shift the valve member 202 toward the left.

A small diameter pipe 78a, of approximately one eighth inch diameter connects the pipe 78 with the pipe 210 which serves when the valve 200 is positioned as illustrated in Fig. 3 to pass a small quantity of fluid under pressure through both of the pipes 205 and 210 into the cylinder chambers 197 and 199. The quantity of fluid passing through the pipe 178 being merely sufficient to compensate for leakage and thereby to prevent air from getting into the system.

In the position of the valve 200 as illustrated in Fig. 3, fluid under pressure in the pipe 78 passes through the pipe 78a, through a pipe 210 into a valve chamber and also passes through a pipe 205, through ports 206 and 211 in the valve 192, through ports 207 and 212 and the pipes 196 and 198 into the cylinder chambers 197 and 199. It will be readily apparent that fluid under pressure is balanced on opposite sides of the piston 17 to facilitate a manual traversing movement of the table 11 by means of the hand traverse wheel 14. It will be readily apparent from the foregoing disclosure that fluid may readily pass from cylinder chamber 197 through the pipes, ports and valve 200 into the cylinder chamber 199 to facilitate a manual traverse of the table 11 without overcoming fluid under pressure within the system.

When solenoid S2 is energized to admit fluid under pressure to the valve chamber at the left hand end of the valve 200 to move the valve member 202 toward the right, fluid under pressure from the pipe 78 passes through the pipe 204 and out through the port 208 in the valve 200, through the pipe 205 will pass through the ports 206 and 207 in the valve 192 and through the pipe 198 into the cylinder chamber 199 to cause the table 11 to move toward the right.

Similarly when the shuttle valve 193 is moved toward the right into an extreme right hand end position, fluid under pressure passing through the pipe 205 passes through the port 206, into a valve chamber in the valve 192, through the port 212, and through the pipe 196 into the cylinder chamber 197 to cause the cylinder 16 and the table 11 to move toward the left. It will be readily apparent from the foregoing disclosure that when the solenoid S2 is energized, the valve 200 will be positioned to control the admission of fluid through the pipe 205 to the shuttle valve 192 and the table cylinder 16. When the solenoid S2 is deenergized, the valve 200 is positioned as shown in Fig. 3 to facilitate bypassing of fluid between the opposite ends of the cylinder 16 to facilitate a manual traverse of the table 11. The actuation of the reversing valve 182, as previously described, controls the shifting movement of the shuttle valve 192 to change the direction of movement of the table 11.

The valve 201 comprises a slidably mounted valve member 215 and a pilot valve 216 which is actuated by a solenoid S7. In the position of the valve 201 as illustrated in Fig. 3 with the solenoid S7 deenergized, fluid under pressure in the pipe 78 passes through the pilot valve 216, through a passage in the valve 210 to move the valve member 215 toward the left. In this position of the valve, fluid under pressure in the pipe 210 passes through a port 217 into a valve chamber within the valve 210, through a port 218, through a pipe 219, through a throttle valve 220, through a pipe 221 and through a relief valve 222 into the reservoir 77.

When the solenoid S7 is energized to shift the pilot valve 216 toward the left, fluid under pressure from the pipe 78 passes through a passage in the valve 201 into the chamber at the left hand end of the valve to move the valve member 215 toward the right so that fluid exhausting through the pipe 210 from the shuttle valve 192 and the cylinder 16 may pass through the port 217, through a chamber in the valve 201, through a port 223, through a pipe 224, through a throttle valve 225 which serves to throttle the speed of movement of the table 11 to a slow truing speed for a truing operation. Fluid passing through the throttle valve 225 passes through the pipe 219, the throttle valve 220, the pipe 221, and the relief valve 222 into the reservoir 77.

When the reversing lever 175 is shifted in a counterclockwise direction (Fig. 3) into its reverse position, fluid under pressure will pass through a pipe 226, through the pipe 195 into the end chamber 194 of the valve 192 to shift the valve member 193 toward the right into its reverse position so as to reverse the direction of movement of the table 11.

Fluid exhausting through the pipe 224 during the normal table indexing movement may pass through a throttle valve 226a which serves to control the normal indexing speed of the table 11 and pass through a ball check valve 227, through a pipe 228, through a port 229 into a control valve 230 which is actuated by a solenoid S1. As shown in Fig. 3, solenoid S1 is energized and the valve member is in its extreme left hand end position so that fluid passing through the port 229 passes out through a port 231, through a pipe 232, through a port 233 in a control valve 234. The control valve 234 is substantially identical with control valves 80 and 81 and comprises a slidably mounted valve member 235, and a pilot valve 236 which is actuated by a solenoid S4. In the position of the valve 234 (Fig. 3) fluid under pressure in the pipe 78 passes through the pilot valve, through a passage in the valve 234 into the left hand end chamber to shift the valve member 235 into its extreme right hand end position. Fluid under pressure entering the port 233 passes out through a port 237, through a pipe 195 into a chamber 238 formed at the lower end of a spring pressed valve 239. Pressure entering the valve chamber 238 raises the valve member 240 so that fluid within the pipe 219 may exhaust through a chamber in the valve 239 and pass out through a pipe 241, through a throttle valve 242, through a pipe 243 and through the relief valve 222 into the reservoir 77. The valve 239 is operative during the idle return stroke of the table 11 to facilitate a rapid return stroke. The valve 242 serves to regulate fluid exhaust through the valve 239 so that the rate of the idle stroke may be rapidly adjusted.

The solenoid actuated valve 230 serves when solenoid S1 is deenergized to admit fluid under pressure to an index cylinder 245 to move a piston 246 downwardly against the compression of a spring 244.

Figure 9:
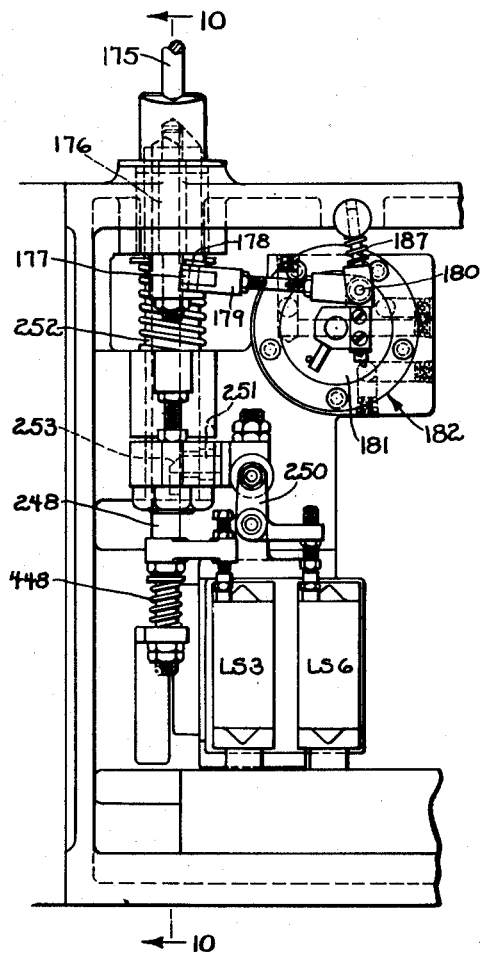
Fig. 9 is a fragmentary front elevation, on an enlarged scale, of the reversing lever and valve and the table indexing controls.

The index cylinder serves to control a pair of indexing plungers to be hereinafter described. In order to facilitate an automatic indexing of the table 11, a plurality of indexing dogs 247 are adjustably mounted on the front edge of the machine table 11. There is one dog 247 for locating the table in the position for grinding each cam on the camshaft 27. A vertically movable plunger 248 is provided at its upper end with an arrow-pointed end portion 249 which is arranged in the path of the dogs 247. When the table moves toward the right (Fig. 3) the first dog 247 engages the arrow point 249 on the plunger 248 and depresses the plunger 248 to actuate and open the normally closed limit switch LS3. At the same time the downward movement of the plunger 248 operates through a bell crank lever 250 (Fig. 9) to close a normally open limit switch LS6. The bell crank lever 250 is actuated by means of a transversely arranged plunger 251 carried by a plunger 252. A cam face 253 formed on the plunger 248 serves when the plunger 248 is moved downwardly to move the plunger 251 toward the right (Figs. 3 and 9) to close the limit switch LS6. When the plunger 248 is moved downwardly by means of the dog 247 engaging the arrow point 249, the table movement is slowed down so that the table will stop when the right hand side face of the dog 247 moves adjacent to or into engagement with a stop surface 254 formed on the plunger 252. After a cam has been ground to the desired extent, fluid under pressure is passed through a pipe 255 from the valve 230 into a chamber 256 at the upper end of the index cylinder 245 to move the piston 246 downwardly. The downward movement of the piston 246 moves the plunger 252 downwardly. This downward movement of the plunger 252 serves to allow the plunger 251 to move toward the left to open the limit switch LS6 and at the same time withdraw the plunger 252 out of the path of the table index dog 247 so that the table 11 may start its next indexing movement toward the right. As soon as the plunger 252 has passed the first dog 247, the valve 230 is actuated to allow fluid to exhaust through the pipe 255 from the cylinder chamber 256 thereby releasing the compression of the spring 242 which allows the plungers 252 and 248 to move upwardly into the position shown in Fig. 3. The table indexing movement continues until the second dog engages the arrow point 247 and again stops the table 11 in an indexed position in a manner similar to that above described.

A wheel spindle reciprocating mechanism is provided within the wheel slide 30 for reciprocating the wheel spindle 31 axially within its bearings during a grinding operation. The mechanism has not been illustrated in detail since it is not considered a part of the present invention. Reference may be had to the prior United States patent to G. T. Muskovin dated April 8, 1941 for details of disclosure not contained herein. Briefly the valve 230 serves when the solenoid is deenergized to admit fluid to the index cylinder 245. When solenoid S1 is energized the valve 230 serves to allow fluid to exhaust from a cylinder chamber 260 in a cylinder 261 which controls the stopping and starting of the wheel spindle reciprocation. Fluid exhausting from the cylinder chamber 260 passes through a pipe 262 which connects with the pipe 228. The solenoid S1 is energized only when the machine is set for a truing operation or in a loading position. At all other times the wheel spindle reciprocating mechanism is operative to reciprocate the wheel axially during a grinding operation. The valve 234 serves when solenoid S4 is deenergized to admit fluid to the cylinder chamber 260 to stop the wheel spindle reciprocation. This happens only when solenoid S1 is also energized. When solenoid S4 is deenergized the valve 234 also passes fluid to the table index cylinder after an electric counter has counted out to again index the table 11 for the next grinding operation. When solenoid S4 is deenergized and solenoid S1 is energized during a truing operation, fluid under pressure is passed through the pipe 228 to hold the check valve 227 closed so that fluid exhausting from the table cylinder 16 must pass through the truing speed control valve 225 to provide a slow traversing movement of the table.

Figure 2:
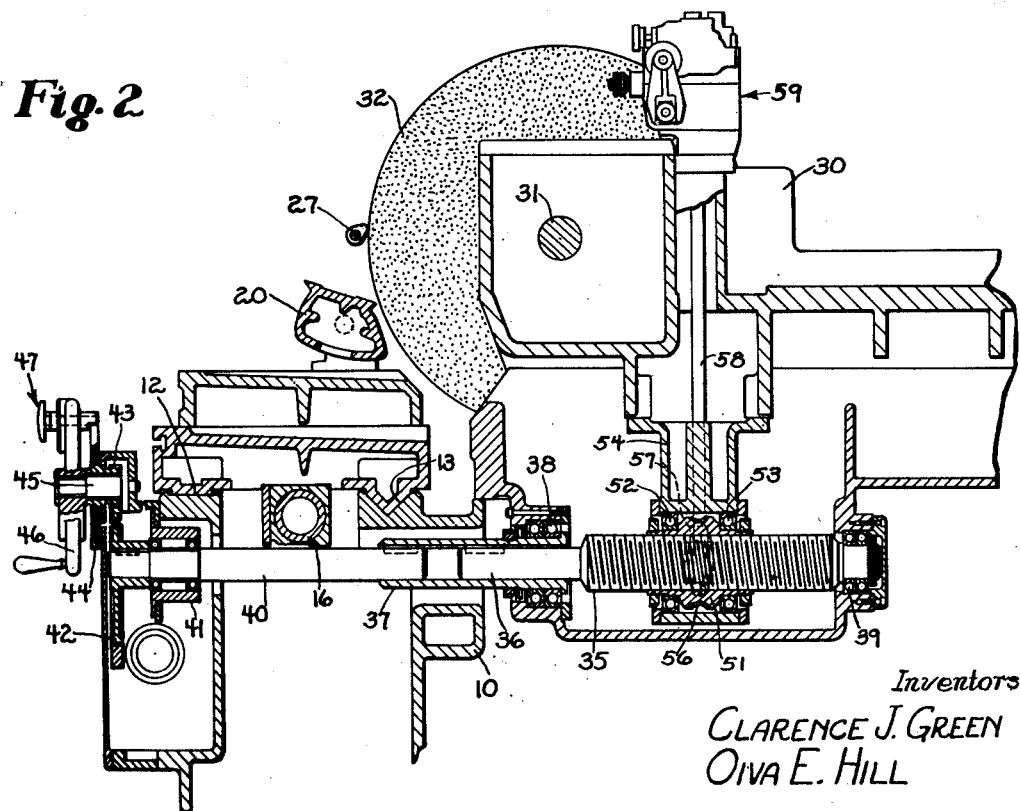
Fig. 2 is a fragmentary cross sectional view, on an enlarged scale, taken approximately on the line 2—2 of Fig. 1 through the wheel feeding mechanism.

The secondary wheel feeding mechanism, namely the compensator 59 is shown diagrammatically in Fig. 3 as a cylinder 265 and a piston 266. A pipe 267 connects the pipe 185 with the compensator unit 59. A pipe 268 connects the pipe 190 with the compensator unit 59. A shut-off valve 269 is provided in the pipe line 268 to facilitate shutting off the compensator 59 when desired. This compensating unit 59 will be more fully described hereinafter. This compensating mechanism comprises a piston and cylinder controlled by a control valve for actuating a pawl and ratchet mechanism to rotate the vertical shaft 58 (Fig. 2) to impart a rotary motion to the feed nut 51 so as to advance the grinding wheel 32 before each pass of the truing tool across the face of the wheel. This compensating adjustment of the feed nut 51 facilitates an advancing movement of the grinding wheel without disturbing the normally operated grinding wheel feed mechanism.

A cycle control lever 270 is pivotally supported on the front of the machine base on a stud 271. When the cycle control lever is rocked in a clockwise direction it closes a cycle start switch 272 to start a grinding cycle. A cycle stop switch 273 is arranged so that when the lever 270 is rocked in a counter-clockwise direction, the cycle stop switch 273 will be opened to stop the grinding cycle when desired.

A main control lever 275 (Figs. 1 and 13) is mounted on the upper end of a vertically arranged shaft 276. The lower end of the shaft 276 is provided with an actuating arm 277 which is arranged to engage an actuating plunger 278 which in turn serves to actuate a limit switch LS7. A compression spring 279 serves normally to hold the plunger 278 in an uppermost position. A vertically arranged plunger 280 having an arrow point end 281 carries an arm 282 at its lower end. The arm 282 is provided with an adjustable screw 283 to actuate a limit switch LS9. The arm 282 is also provided with an adjustable stop screw 284 to actuate a limit switch LS1. A spring 285 serves normally to hold the plunger 280 in an uppermost position. As the table 11 is moved longitudinally, a dog 286 engages the arrow point on the plunger 280 to depress the plunger 280 so as to actuate both the limit switch LS1 and the limit switch LS9 as will be more fully described hereinafter. The rotary motion of the control lever 275 is restricted by means of a stud 289 and an arcuate notch 288 formed in the lower surface of the control lever 275. A projection 302 on the control lever 275 serves during the grinding cycle to rock the lever 275 to actuate and open the normally closed limit switch LS7 in a manner to be hereinafter described.

A suitable driving mechanism is provided for driving the master cam spindle 23 and the center 24 during the rocking movement of the rock bar 20 so that the camshaft being ground will be rotated at a continuously changing speed, such as, a speed which starts at approximately a rough grinding speed and is continuously diminished until the work has been ground to the desired size and contour. This mechanism may comprise an electric motor 290 mounted on the upper surface of the headstock casing 115. The motor 290 is provided with a multi V-groove pulley 291 which is connected with V-belts 292 with a pulley 293 which is mounted on a shaft 294. A small multi V-groove pulley 295 is also supported on the shaft 294 and is fixedly connected to rotate with the pulley 293. Multiple V-belts 296 connect the pulley 295 with a multi V-groove pulley 297. The pulley 297 is connected by a driving rod 298 to drive the master cam spindle 23 during the rocking movement of the rock bar 20. The driving rod 298 is pivotally connected by a stud 299 with the pulley 297. The other end of the rod 298 is connected by a universal joint 300 with a bracket 301 fastened to or fixedly mounted on the end of the master cam spindle 23.

Figure 30:
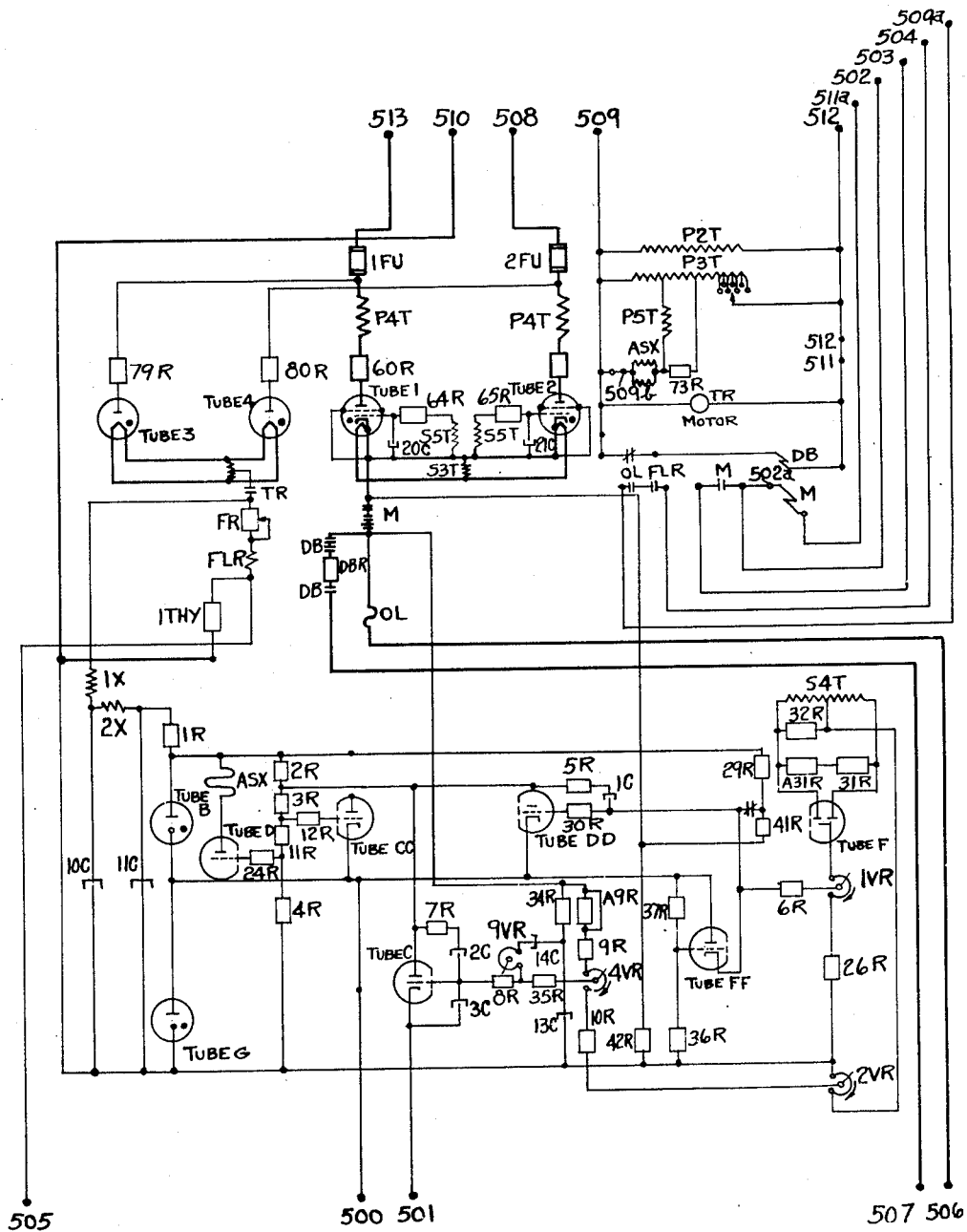
Fig. 30 is an elementary electric diagram of the electronic control unit.

The headstock motor 291 is preferably a variable speed D. C. motor which is controlled by a suitable electric control apparatus which may comprise a Selsyn generator 305 which is arranged through a Selsyn control panel 306 (Fig. 21) to control an electronic control apparatus such as a Thy-mo-trol control panel 307. As illustrated in Fig. 30, the work drive motor 291 is a part of and controlled by a General Electric Company "Thy-mo-trol" electronic control unit 307 (Fig. 21) which is shown diagrammatically in Fig. 30. This "Thy-mo-trol" equipment consists essentially of an anode transformer (Fig. 21), electronic power and control circuits shown schematically in Figs. 21 and 30, a direct current work drive motor 291 (Fig. 21) and a Selsyn generator with its speed control panel (Fig. 21) whose function will be described later. The standard General Electric "Thy-mo-trol" electronic control unit is covered by U. S. Patent No. 2,312,117 to E. E. Meyer et al. dated February 23, 1943, to which reference may be had for details of disclosure not contained herein. This equipment is a standard unit as manufactured by the General Electric Company with the exception that the conventional manually operated potentiometer for speed variation by armature voltage control is replaced by a Selsyn generator and the connected rectification control panel, whose output rectified signal is used to control the speed of the motor which will be described in detail later.

From the elementary electrical diagram shown in Fig. 30 it can be seen that the standard "Thy-mo-trol" electronic control unit consists essentially of the following elements, tubes 1 and 2 constitute a rectifier which converts to direct current the alternating current supplied by the anode transformer. This direct current is then fed through the armature of the work drive motor 291. Likewise tubes 3 and 4 make up a rectifier which supplies direct current to the shunt field of the motor 291. By varying the output of the rectifier for the motor armature, it is possible to control the operation of the motor 291. Its speed can be varied from zero by armature voltage control up to the base speed for which the motor is designed to operate. The means by which the output of the power rectifier is varied is a group of tubes B, C, D, F, and G whose basic circuit is shown in Fig. 30. Acting as amplifiers of current and voltage signals received from the motor circuit, these tubes supply the necessary direct current to the saturating winding of the saturable core reactor in the resistance reactance bridge which is used to vary the output voltage of the power rectifiers by the phase-shift method. By varying the current in the saturating winding, the power tubes are turned on or off as required to give the desired motor performance.

The speed adjustment for the motor 291 is controlled from the mechanical positioning of the Selsyn rotor by a cycle cam and connecting mechanism to be hereinafter described. The induced voltages in the secondary windings of the Selsyn rotor, changing as the angular displacement of the rotor changes from zero to maximum, are stepped up and rectified to the proper value necessary for the reference voltage feeding the voltage divider circuit normally controlling the amplifier tube C, for the armature voltage thyratron tubes 1 and 2. In this way the work motor speed becomes the function of the varying angular displacement of the Selsyn rotor.

A plurality of terminals 500, 501, 502, 502a, 503, 504, 505, 506, 507, 508, 509, 509a, 509b, 510, 511, 511a, 512 and 513 shown on the "Thy-mo-trol" work drive panel 307 (Fig. 21) are shown also in Fig. 30 to illustrate the inter-connections between the Selsyn generator 30, the Selsyn control panel 306 and the "Thy-mo-trol" work drive panel 307. By varying the position of the Selsyn generator rotor, an alternating current excitation voltage is impressed on the Selsyn primary winding which induces unequal voltages in the Selsyn secondary winding depending on the position of the primary rotor. These induced voltages, varying by a mechanical positioning of the rotor, serve to produce the desired diminishing speed of the headstock motor 290.

The generator signals set up by the Selsyn generator 305 are stepped up by the apparatus contained in the Selsyn control panel 306 and rectified to the proper value necessary for a reference voltage to connect with the headstock drive motor 290 and the electronic control panel 307. The reference voltage or speed signal, varying as the Selsyn rotor changes position, replaces the reference voltage variable by manual potentiometer method, and is fed to the usual voltage divider circuit normally controlling the amplifier tube for the armature voltage thyratron tubes. Thus the D. C. motor speed is a function of the angular displacement of the Selsyn rotor.

The Selsyn control panel 306 contains a pair of transformers 308 and 309, the primary windings of each transformer are connected in parallel while the primaries of the two transformers considered as a whole are connected in series. The legs of the three star-connected secondary winding of the Selsyn generator are connected to the transformers 308 and 309 in such a manner that one leg 310 of the Selsyn star-connected windings is hooked to the mid point of the two tied-in transformer primaries, the second leg 311 is connected to one end of the transformer hook-up and the third leg 312 to the remaining end of the transformer hook-up.

The double winding secondaries of the transformers 308 and 309 are in turn independently hooked-up to each plate of two twin diode 6X5Gt tubes 313 and 314 to obtain a full wave rectified signal. A third twin diode 6X5Gt tube 315, whose cathode is one side of the output reference voltage and whose plate circuits are adjusted by potentiometers 316 and 317, which effectively varies the number of degrees rotation necessarily made by the rotor of the Selsyn generator 305 before maximum output voltage is reached, constitutes the other line of the reference voltage. The value of this voltage can be made equal to the reference voltage of the main electronic control panel 307 to which it is connected by adjusting the potentiometers 316 and 317 for maximum displacement of the rotor of the Selsyn generator 100. A third transformer 318 for tube filament voltage supply, two reactors 319 and 320, two resistors 321 and 322, and two capacitors 323 and 324 necessary for circuit performance complete the Selsyn control panel assembly.

Power is supplied through a pair of power lines 325 and a main switch 326 is provided to connect power to the work drive motor circuit above described. Power lines 330 and 331 from the main switch 326 (Fig. 21) connect with lines 330 and 331 (Fig. 4). A start switch LS8 serves when actuated by rocking of the rock bar 20 to an operative position to start the work drive motor as the master cam 116 is moved into operative engagement with the master cam roller 117.

To facilitate setting up the machine, a jog switch 327 is provided which when closed serves to energize a relay switch MH (Figs. 4 and 21) to jog the work drive motor 291 through the control apparatus above described. The jog switch 327 is connected so as to be actuated when a stop button stop switch 471 is actuated beyond the stop position.

The control mechanism for actuating the Selsyn generator rotor may comprise the hydraulic cylinder 160 which contains a slidably mounted piston 161. The piston 161 is connected to one end of a piston rod 162. The other end of the piston rod 162 is connected to a slidably mounted rack bar 333. The rack bar 333 meshes with a gear 334 on a rotatable shaft 335. The other end of the shaft 335 supports an adjustably mounted cam or eccentric 336, the adjustment of which will be hereinafter described. A follower 337 engages the periphery of the eccentric 336 and is connected to one end of a slide rod 338. A compression spring 339 serves normally to maintain the follower 337 in operative engagement with the eccentric 336 as it rotates. The slide rod 338 is connected at its other end with a slidably mounted rack bar 340 which meshes with a gear 341 mounted on the outer end of a rotor shaft 342 of the Selsyn generator 305.

Fluid under pressure is supplied to the cylinder 160 from the feed control valve 80 (Fig. 3) through piping above described.

Figure 15:
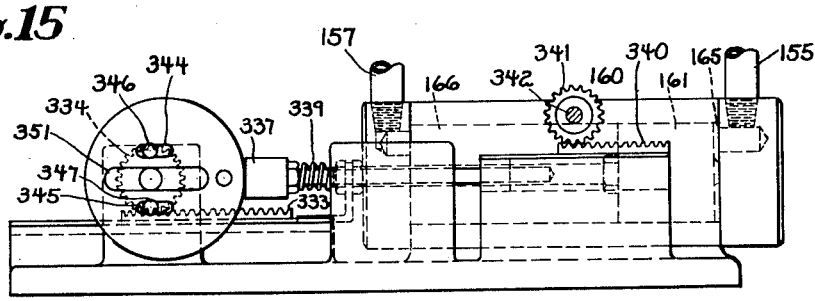
Fig. 15 is a sectional view, taken approximately on the line 15—15 of Fig. 14.
Figure 16:
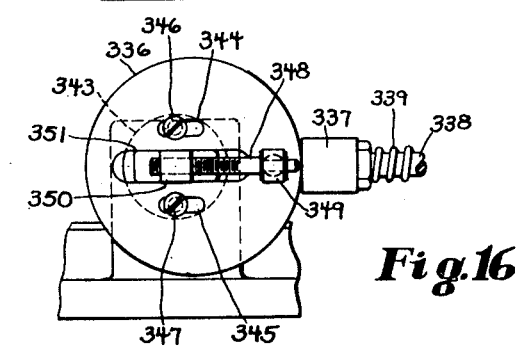
Fig. 16 is a fragmentary detailed view, showing the adjustment for the eccentric or cam for actuating the Selsyn generator rotor.

In order to adjust the rotary motion imparted to the rotor of the Selsyn generator 305, it is desirable to provide an adjustable mounting for the eccentric 336 so that it may be adjusted in a direction normal to the shaft 335. The shaft 335 is provided with an integral flange 343. The eccentric 336 is provided with a pair of parallel elongated slots 344 and 345 (Fig. 15). A pair of screws 346 and 347 pass through elongated slots 344 and 345 respectively and are screw threaded into the flange 343. The screws 346 and 347 serve to clamp the eccentric 336 in adjusted position on the flange 343. To facilitate a precise adjustment of the eccentric, an adjusting screw 348 is carried by a boss 349 (Fig. 16) which is fixedly mounted on the eccentric 336. The screw 348 meshes with a nut 350 which is fixedly supported on the end of the shaft 335 in fixed relation with the flange 343. The nut 350 passes through an elongated slot 351 formed in the eccentric 326 so as to facilitate a transverse adjustment of the eccentric 336. To adjust the position of the eccentric 336 relative to the shaft 335, it is merely necessary to loosen the clamping screws 346 and 347 and then to adjust the screw 348 so as to position the eccentric 326 as desired. After the desired adjustment has been made the clamping screws 346 and 347 may again be tightened to lock the eccentric 336 in adjusted position relative to the flange 343 and the shaft 335.

It may be desirable to arrange the work rotation control mechanism so that the work piece or camshaft to be ground may be rotated at a predetermined constant speed during a grinding operation. This may be accomplished by allowing the piston 161 to move toward the right (Fig. 3) to shift the rotor of the Selsyn generator 305 until the camshaft being ground is rotating at the desired speed, at which time, the valves 164 and 167 may be closed so as to prevent admission to or exhaust of fluid from the cylinder 160. With the valves 164 and 167 closed, the piston 161 remains stationary so as to hold the rotor of the Selsyn generator 305 stationary so that the work drive motor 291 rotates the camshaft to be ground at the desired constant speed. It will thus be seen that by positioning the piston 161 and locking it in adjusted position, any constant speed between the maximum and minimum may be obtained.

As shown in the electrical diagram in Fig. 4, a start switch 360 and a stop switch 361 are provided for actuating a magnetic switch MW to control the starting and stopping of the wheel drive motor 33. A start switch 362 and a stop switch 363 are provided for actuating a magnetic switch MP to start or stop both a hydraulic pump driving motor 364 and a coolant pump motor 365. The cycle control start switch 272 and stop switch 273 previously described are actuated by the cycle control lever 270 to control a magnetic switch CR1 which renders the control apparatus operative for starting an automatic cycle of operation. An electric counter 366 is provided such as an automatically reset counter such as that known as the Microflex counter manufacturered by the Eagle Signal Corporation of Moline, Illinois, is provided for controlling the duration of each cam grinding cycle. A selector control switch 367 is provided so that the machine may be operated manually if desired, or with the counter operative. When the switch is actuated to an "on" position to render the electric counter 366 operative, each time the rock bar 20 is oscillated during the grinding of a cam blank, the limit switch LS5 is opened to impart an impulse to the electric counter. After a predetermined number of oscillations of the rock bar, the counter counts out and breaks a circuit to stop the grinding operation. A signal light 368 is provided which is arranged to give a visible signal to the operator when the tubes of the electronic control apparatus have heated to operating temperature so to visibly indicate that a grinding cycle may be safely started.

If it is desired to control the work rotation manually during set-up, the selector switch 367 is shifted to an "off" position as shown in Fig. 4 to render the electric counter 366 inoperative. The work drive motor 291 may then be controlled manually by means of a start switch 470 and a stop switch 471 (Fig. 4) to facilitate setting-up the machine. Manual closing of the start switch 470 serves to energize switch CR5 which closes a circuit to energize the switch CR2. Closing switch CR2 serves to energize switch MH to start rotation of the work drive motor 291. The motor 291 may be stopped, when desired, by manual actuation of the stop switch 471.

The jog switch 327 may be actuated, with the selector switch 367 in either an "off" or "on" position, to energize switch MH to jog the work drive motor 291 to facilitate either setting-up the machine or inspection of the workpiece being ground.

When selector switch 367 is in an "on" position to render the electric counter 366 operative, actuation of the limit switch LS8 by movement of the rock bar 20 to and from an operative position controls the starting and stopping of the work drive motor 291. When the rock bar 20 is moved to an operative position, the normally closed limit switch LS8 closes to energize the switch CR2 which closes a circuit to energize the switch MH thus closing the circuit to start the work drive motor 291. After a cam blank has been ground to the desired size and contour, rocking of the rock bar 20 to an inoperative position serves to open the limit switch LS8 which serves to deenergize the switch CR2. The work drive motor 291 continues to rotate due to a holding circuit in the switch MH until the high point on the cam 473 mounted on the master cam spindle 23 opens the limit switch LS2. Opening the limit switch LS2 breaks the holding circuit so as to deenergize the switch MH thus stopping the work drive motor 291 with the master cam spindle in a predetermined position. The cam 473 is mounted on the master cam spindle 118 (Fig. 19) and the limit switch LS2 is fixedly supported within the headstock housing 115 so that the cam 473 is only positioned to actuate the switch LS2 when the rock bar 20 is rocked to an inoperative position.

A suitable automatic feeding mechanism is provided to advance the wheel slide for a truing operation which is independent of the main wheel feeding mechanism. This feeding mechanism is contained within the casing 59 on the top of the wheel slide 15. A ratchet wheel 370 is mounted on the upper end of the vertical shaft 58. An actuating pawl 371 is pivotally supported by a stud 372 which is carried by a pawl supporting arm 373 arranged to rotate about the shaft 58. A gear segment 374 is formed on the pawl supporting arm 373 which meshes with a slidably mounted rack bar 375 which is arranged to be moved longitudinally by means of a hydraulically operated mechanism, to be hereinafter described, automatically to advance the wheel slide 15 before each pass of the truing tool across the face of the grinding wheel 32.

Figure 24:
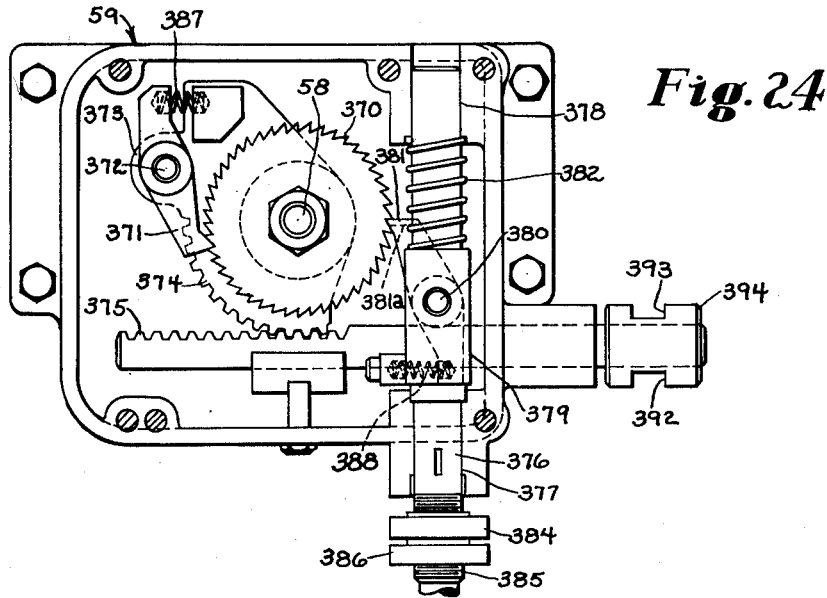
Fig. 24 is a plan view, on an enlarged scale, of the truing feed compensator unit having the top cover removed.

It is desirable to provide a manually operable means for controlling the ratchet wheel 370 to compensate for grinding wheel wear between truing cycles without disturbing the setting of the wheel feeding mechanism. This mechanism may comprise a horizontally extending slidably mounted shaft 376. The shaft 376 is slidably mounted in bearings 377 and 378 formed in the casing 59. The shaft 376 serves as a support for a sleeve or bracket 379 which supports a stud 380. The stud 380 serves as a pivotal support for a pawl 381 which is arranged to engage the teeth of the ratchet wheel 370. A compression spring 382 normally maintains the shaft in a forward or downward position (Fig. 24). An actuating knob 383 is mounted on the outer end of the shaft 376 by means of which the pawl 381 may be manually actuated to turn the ratchet wheel 370 and thereby impart a rotary motion to the nut 51. A nut 384 on a threaded portion 385 of the shaft 376 serves to limit the rearward or upward motion of the shaft 376 thereby controlling the extent of movement of the pawl 381. By adjusting the nut 384, one or more teeth of the ratchet 370 may be picked up at each actuation of the knob 383. A lock nut 386 serves to hold the nut 384 in adjusted position. The pawl 381 is preferably formed has two pawls 381 and 381a, one of which is slightly shorter than the other so that when the knob 383 is actuated, a fraction of a tooth or more of the ratchet wheel 370 may be picked up for each actuation thereof. The pawl 381a being slightly shorter than the pawl 381 will permit actuation of the ratchet wheel 370 less than one tooth at each actuation of the knob 383.

Figure 23:
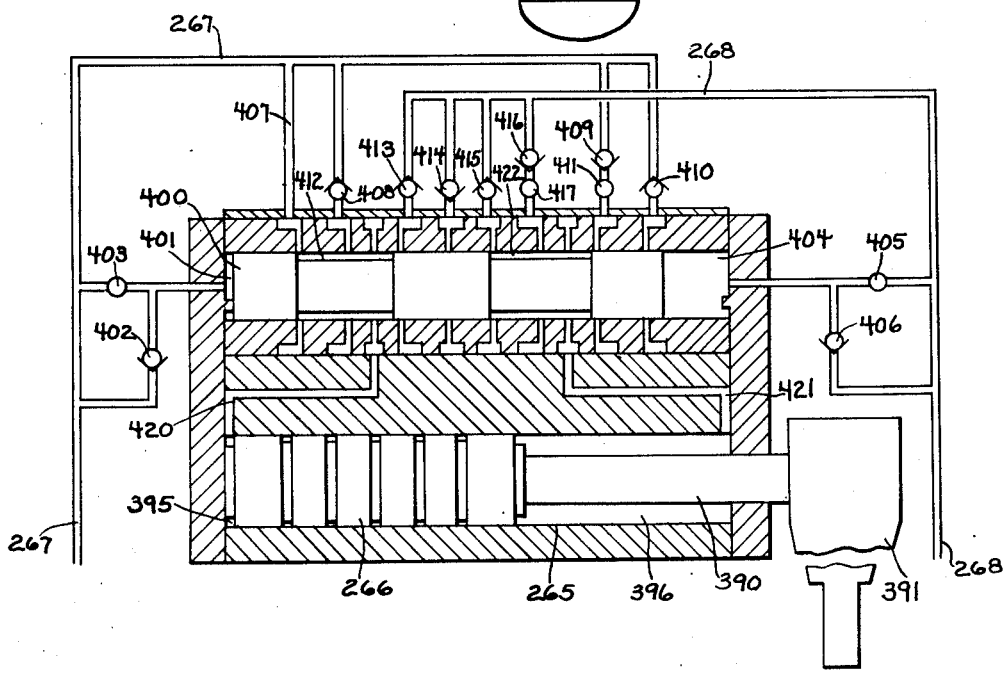
Fig. 23 is a hydraulic diagram of the fluid motor and control valves of the truing feed compensator.

A hydraulically operated mechanism is provided for actuating the rack bar 375 automatically to feed the grinding wheel 32 inwardly by varying amounts before each pass of the truing tool across the operative face of the grinding wheel 32. This mechanism preferably comprises the hydraulic cylinder 265 which is formed within the casing 59. The cylinder 265 contains the slidably mounted piston 266 which is provided with a piston rod 390. A yoked member 391 is mounted on the right hand end of the piston rod 390 (Fig. 23). The yoked member 391 rides within grooves 392 and 393 formed in a sleeve 394 which is fixedly mounted on the right hand end of the rack bar 375 (Fig. 24). When fluid under pressure is passed into a cylinder chamber 395 to cause the piston 266 to move toward the right, the yoked member 391 will move the rack bar 375 toward the right. This movement of the rack bar 375 serves to rotate the gear segment 374 in a counter-clockwise direction so that the ratchet pawl 371 will impart a rotary motion to the ratchet wheel 370 and thereby to impart a rotary motion to the vertical shaft 58. Rotary motion of the shaft 58 serves through the worm 57 and the worm gear 56 to rotate the nut 51 (Fig. 2) to impart a forward feeding movement to the grinding wheel 32 and the wheel slide 30.

During this movement of the piston 266 toward the right, fluid within a cylinder chamber 396 will exhaust in a manner to be hereinafter described. Similarly, when fluid under pressure is admitted to the cylinder chamber 396 to move the piston 266 toward the left, the rack bar 375 moves toward the left to impart a rotary motion to the gear segment 374 in a clockwise direction during which movement the pawl 371 rides idly over the teeth of the ratchet wheel 370 so as to reset the pawl 371 for the next infeeding movement prior to the second pass of the truing tool across the peripheral face of the grinding wheel 32. In other words, when the piston 266 is moved toward the right (Fig. 23) an infeeding movement is imparted to the grinding wheel 32 and when the piston 266 is moved toward the left, a return stroke is imparted to the feed pawl 371 to reset the same.

A shuttle type control valve 400 is provided to control the movement of the piston 266. When fluid under pressure is admitted into a valve chamber 401 from the pipe 267, the valve 400 will be moved toward the right. A ball check valve 402 is opened by fluid under pressure within the pipe 267 so that it may by-pass a throttle valve 403 to allow substantially unrestricted flow of fluid under pressure into the valve chamber 401. When the valve 400 is moved toward the right (Fig. 23) fluid within a valve chamber 404 may exhaust through a needle valve 405 and through the pipe 268. The needle valve 405 serves to control the rate of movement of the valve 400 during its movement toward the right. A ball check valve 406 is connected so that when fluid under pressure is passed through the pipe 268, it may by-pass the throttle valve 405 and pass through the ball check valve 406 into the valve chamber 404 to move the valve 400 toward the left. During movement of the valve 400 toward the left the throttle valve 403 serves to control the exhaust of fluid from the valve chamber 401 thereby controlling the rate of movement of the valve 400.

A plurality of passages, ball check valves and throttle valves are provided between the pipe 267 and the valve 400 and also between the pipe 268 and the valve 400 so that when pressure is admitted through either the pipe 267 or the pipe 268, the valve 400 will be moved in one direction during which movement the piston 266 will make one complete reciprocation so that the feed pawl 371 will be given one complete oscillation to impart an infeeding movement to the grinding wheel 32 before each pass of the truing tool across the operative face thereof. The pipe 267 is connected by a pipe 407, a ball check valve 408, a ball check valve 409 and a ball check valve 410 with the valve 400. The pipe 267 which is connected to the pipe 407 serves in the position of parts illustrated in Fig. 23 to pass fluid under pressure through the pipe 407 into a valve chamber in the valve 400. Similarly, the pipe 268 is connected by a ball check valve 413, a ball check valve 414, a ball check valve 415, a ball check valve 416 and a throttle valve 417 with the valve 400.

When fluid under pressure is passed through the pipe 267 and the pipe 407 into a valve chamber 412, it will pass through a passage 420 into the cylinder chamber 395 to move the piston 266 toward the right (Fig. 23). During this movement fluid within the cylinder chamber 396 is exhausted through a passage 421 into a valve chamber 422 and out through the throttle valve 417 and the ball check valve 416 into the pipe 268.

The throttle valves 411 and 417 serve to control the rate of fluid exhausting from the chambers 396 and 395 so as to control the rate of movement of the piston 266. The needle valves 403 and 405 serve to control the rate of shifting of the valve 400. By regu'ating the throttle valves 411, 417, 403 and 405, the rate of movement of the valve 400 may be regulated and the speed of movement of the piston 266 may be readily controlled. The rate of movement of the valve 400 serves to determine the length of stroke of the piston 266 and thereby determines the extent of actuation of the pawl 371 during each reciprocation of the piston 266.

A grinding wheel truing device 430 is provided with a dovetailed surface 431 on its underside which mates with a correspondingly shaped dovetailed surface formed on the upper face of the rock bar 20. The truing apparatus may be clamped in position by means of a clamping screw 432. A cylindrically shaped slidab'y mounted truing tool holder 433 is slidably keyed within a cylindrical aperture 434 formed in the truing apparatus frame 430. A truing tool such as a diamond 435 is mounted in the right hand end of the truing tool holder 433 (Fig. 22). A rotatable screw 436 is threaded into an aperture formed within the truing tool holder 433. The screw 436 is journalled in a bearing 437 formed within the truing apparatus frame 430. An adjusting knob 438 is fixedly mounted on the left hand end of the screw 436 by means of which the truing tool holder may be adjusted toward and from the grinding wheel 32. A compression spring 439 is provided between the screw 436 and the truing tool holder 433 to take up backlash between the screw 436 and the threaded aperture in the holder 433. After the diamond 435 has been initially set in a predetermined position for an automatic truing operation, further adjustment thereof is not necessary except to compensate for wear on the diamond 435, or in resetting the diamond after a new grinding wheel has been mounted in the machine. During the automatic cycle of operation the truing apparatus 430 remains mounted in fixed position on the rock bar 20 so that during the cycle above referred to the diamond will be in fixed position for a grinding wheel truing operation when the table 11 moves into a grinding wheel truing position.

A truing dog 450 (Figs. 7, 8, 25 and 26) is adjustably clamped on the front edge of the table 11. A vertically movable slide 451 is mounted on slideways 452 formed on the dog 450. The lower face of the slide 451 is provided with a cam 453 which is arranged to engage the arrow pointed end 249 of the plunger 248 and to depress the plunger 248 as the table 11 approaches a truing position so as to slow down the speed of the table 11 to a predetermined slow truing speed before the truing tool 435 moves into engagement with the grinding wheel 32. A horizontal face 454 adjacent to the cam face 453 serves to hold the plunger 248 depressed as the table reciprocates during a truing operation.

It may be desirable at times to render the cam 453 and the horizontal face 454 inoperative so that an automatic cycle of grinding may be obtained without a truing operation. It is therefore desirable to provide means for raising the slide 451 so that the cam 453 and the horizontal face 454 are moved upwardly out of the path of the arrow pointed end 249 of the plunger 248. A stud 455 is mounted on the truing dog 450. The stud projects through an elongated slot 456 in the slide 451. An eccentric 457 is rotatably supported on the stud 455 with its periphery eccentric to the axis of the stud 455. The eccentric 455 rides in the elongated slot 456 so that when the eccentric 457 is rotated on the stud 455, the slide 451 will be moved vertically. The stud 455 is provided with a threaded portion (Fig. 26) which supports a knur'ed nut 458 by means of which the eccentric 457 and the slide 451 may be clamped in position on the truing dog 450. To facilitate actuation of the eccentric 457 a manually operable rod 459 is mounted on a flanged portion 460 formed integral with the eccentric 457. If it is desired to raise the slide 451 to render the truing dog 450 inoperative, the knurled nut 458 is loosened and the eccentric 457 is rotated by manual actuation of the rod 459 after which the knurled nut 458 is locked to clamp the eccentric 457 in adjusted position so that the cam 453 and the horizontal face 454 are raised out of the path of the plunger 248. In this position of the truing dog, the idle stroke of the table will continue without the normal slow-down for truing until the table reversing dog 185 engages and shifts the reversing lever 175 to reverse the position of the reversing valve 182. The dog 451 may be rendered operative merely by loosening the knurled nut 458 and rotating the eccentric 457 so that the slide 451 moves downwardly into the operative position as shown in Figs. 7, 8 and 25 after which the knurled nut may again be tightened to lock the slide 451 in adjusted position.

In order to minimize the loss of idle time in the grinding cycle, it is desirable to provide means for varying the slow truing speed of the table so that the truing tool has sufficient time to pass across the face of the grinding wheel 32 and the table is then automatically reversed. In order to prevent an idle stroke of the table during truing, the horizontal face 454 is preferably arranged so that it may be lengthened or shortened as desired depending upon the width of the grinding wheel employed during a grinding operation. This is preferably accomplished by providing a slidably mounted block 461 the lower surface of which is aligned with the horizontal face 454 of the dog 450. The block 461 is adjustably mounted on the slide 451 by means of an elongated slot 462 and a pair of clamping screws 463. The clamping screws 463 pass through the elongated slot 462 and are screw threaded into the slide 451. By loosening the screws 463, the block 461 may be moved longitudinally in a horizontal direction relative to the slide 451 to lengthen or shorten the face 454, as desired.

The mechanism above described is arranged so that the truing tool 435 normally makes one complete reciprocation across the face of the grinding wheel after which the table 11 stops in a loading position. It may be desirable to provide for a continuous truing so that several reciprocations of the truing tool may be obtained in case a new grinding wheel is mounted on the machine so that the truing tool 435 automatically reciprocates across the face of the wheel continuously. This may be accomplished by means of a pivotally mounted detent 466 (Figs. 10 and 27) on the reversing lever 175. The detent 466 is normally swung upwardly to an inoperative position as shown in full lines in Fig. 27. In case a continuous truing operation is desired, when the table is traversing toward the left on its idle stroke, the detent 466 is rocked into dotted line position 466a (Fig. 27) as the truing dog 450 moves past the reversing lever 175. In the dotted line or operative position, the detent 466 lies in the path of a lug 465 on the truing dog 450. In this position of the parts, the lug 465 will engage the detent 466 as the table moves toward the right to shift the reversing lever 175 so as to reverse the movement of the table 11. The lug 465 and the lug 184 respectively will produce a continuous reciprocation of the table 11 and the truing tool 435 as long as the detent 466 remains in the dotted line position 466a. Each time the reversing lever is shifted, the feed compensator 59 is actuated to advance the grinding wheel before each pass of the truing tool across the face of the grinding wheel 32. A continuous truing operation may be terminated when desired by manually swinging the detent 466 into the full line position (Fig. 27) after which the table will move toward the right, as above described, and stop in a loading position.

Describing more fully the function of the various dogs on the front of the machine base, the grinding cycle is started by raising the main control lever 275 so that the lug 302 moves upwardly out of the path of the cam 320 of the loading dog 303 (Fig. 7) after which the lever 275 is moved toward the right to close the limit switch LS7 thereby starting the movement of the table 11 toward the right. The table 11 continues its movement toward the right until the first index dog 247 engages and depresses the plunger 248 to slow down the rapid indexing movement of the table 11 to a slow speed before the right hand side face of the index dog 247 engages the stop face 254 of the plunger 252. This locates the table 11 in a predetermined position to position a cam blank for a grinding operation. The grinding wheel is fed into the cam blank to be ground as the cam blank is rocked in a manner above described to grind the cam blank to a predetermined size and contour after which the plunger 252 is automatically moved downwardly out of the path of the first index dog 247 so as to start the next table indexing movement so as the table moves first at a rapid indexing rate until the next index dog engages and depresses the plunger 248 to slow down and stop the table movement in the next indexed position. As shown in Fig. 7, only four index dogs have been illustrated. In actual practice one table index dog 247 is provided for locating the table 11 for each cam blank on the camshaft to be ground.

After all of the cams on the shaft have been ground as the table 11 is indexed longitudinally toward the right, the table continues its movement toward the right until the reversing dog 186 engages the lug 183 on the reversing lever 175 to shift the reversing lever in a clockwise direction (Fig. 8) so as to reverse the direction of movement of the table 11. The table 11 now moves toward the left through an idle stroke. When the reversing lever 175 is shifted, fluid is passed in a manner above described to the truing feed compensator 59 to advance the grinding wheel for the first pass of the truing tool 435 across the face of the grinding wheel 32. As the table 11 approaches the left hand end of its stroke, the cam 286a of the table dog 286 engages and depresses the plunger 280 to slow the table 11 down to a predetermined slow truing speed before the truing tool 435 moves into engagement with the grinding wheel. Continued movement of the table 11 passes the truing tool 435 across the peripheral face of the grinding wheel 32. Movement of the table 11 toward the left continues until the reversing dog 185 engages the lug 184 and shifts the reversing lever 175 in a counterclockwise direction (Fig. 8). This movement of the reversing lever 175 serves to reverse the movement of the table 11 and start it moving toward the right. At the same time fluid under pressure is passed to the truing feed compensator 59 so as to automatically advance the grinding wheel 32 before the second pass of the truing tool across the face of the grinding wheel.

During the movement of the table 11 toward the right, the lug 302 on the main control lever 275 rides up the cam face 320 on the loading dog 286 against the compression of the spring 274. After the lug 302 passes the end of the cam 320, the released compression of the spring 274 moves the reversing lever 275 downwardly so that when the table 11 moves toward the right after a truing operation, the lug 302 will engage the right hand end face of the cam 320 to shift the main control lever 275 toward the right to stop the movement of the table 11.

Operation

The operation of the automatic camshaft grinding machine will be readily apparent from the foregoing disclosure. Assuming all of the parts and mechanisms to have been previously adjusted for grinding a plurality of cam blanks on a camshaft, the main control switch 326 (Fig. 21) is closed to render the electrical circuits operative. The start switch 360 (Fig. 4) is then actuated to start the grinding wheel driving motor 33. The start switch 362 (Fig. 4) is then actuated to start both the hydraulic pump motor 364 and the coolant pump motor 365. The cycle control lever 270 (Figs. 1 and 3) is then rocked in a clockwise direction (Fig. 3) to close the cycle start switch 272 (Figs. 3 and 4) so as to render the cycle control mechanism operative.

When it is desired to start a grinding cycle, the main control lever 275 is raised against the compression of the spring 274 (Fig. 13) to raise the projection 302 out of the path of the cam 320 of the table stop dog 303 after which the lever 275 is moved toward the right to close the limit switch LS7 and energize the solenoid S2. Energizing the solenoid S2 serves to shift the pilot valve 203 toward the left so that fluid under pressure in the pipe 78 passes through the pilot valve 203 into the left hand end chamber of the valve 200 to shift the valve member 202 toward the right. Due to the reversing lever 175 and the reversing valve 182 being positioned as illustrated in Fig. 3, fluid under pressure passing through the pipe 190 passes into the left hand end chamber 191 to shift the valve member 193 toward the left. Fluid under pressure from the pipe 78 passes through the pipe 205, through a central bore in the valve member 193, through the pipe 198 into the cylinder chamber 199 to index the cylinder 16 and the table 11 toward the right (Fig. 3). The first table index dog 247 moves into engagement with and depresses the plunger 248 to close the limit switch LS6 and to open the limit switch LS3. Closing of limit switch LS6 energizes the solenoid S7 to shift the pilot valve 216 toward the left so that fluid under pressure to the left hand end chamber of the valve 201 to shift the valve member 215 toward the right. Fluid exhausting from the cylinder chamber 197 passes through the pipe 196, the valve 192, the pipe 210, chamber in the valve 201, the pipe 224, through the needle or throttle valve 226 which serves to slow down the movement of the table 11 before the index dog 247 moves in engagement with the plunger 252. Closing of the limit switch LS6 would energize the solenoid S8, but as the table 11 moves the loading dog 286 off the plunger 280, the plunger 280 moves upwardly under the influence of the released compression of the spring 285 (Figs. 3, 12 and 13) to open one of the contactors of the limit switch LS1 and deenergizes the solenoid S8. The closing of the limit switch LS6 does energize the solenoid S3 so as to shift the pilot valve 83 toward the left (Fig. 3) to admit fluid under pressure to the left hand end chamber of the valve 80 to shift the valve member 82 toward the right. With the valve member 82 in the right hand position, fluid under pressure in the pipe 78 passes through a chamber in the valve 80, through the pipe 109 to the valve 81. At the same time, fluid under pressure in the pipe 109, passes through the pipe 155 into the cylinder chamber 152 of the rock bar cylinder 135 to move the piston 136 toward the right (Fig. 3) to rock the rock bar 20 in a counter-clockwise direction (Fig. 5) so the master cam 116 moves into operative engagement with the master cam follower roller 117. Fluid under pressure in the pipe 155 also passes simultaneously through the throttle valves 163 and 164 into the cylinder chamber 165 of the cylinder 160 so as to cause the piston 161 to move toward the right (Fig. 3) thereby starting movement of the Selsyn generator rotor. Movement of the rock bar 20 into an operative position serves through an arm 445 mounted on the rock bar 20, to actuate the limit switch LS8 to start rotation of the work drive motor 290.

With the solenoid S8 deenergized, the valve 81 is positioned as shown in Fig. 3. Fluid under pressure in the pipe 109 passes through a chamber in the valve 81, through the pipe 66 into the cylinder chamber 67 to move the piston 61 toward the right (Figs. 3 and 6) to impart an infeeding movement to the grinding wheel 32 and the wheel slide 30. During movement of the piston 61, toward the right, fluid within the cylinder chamber 68 exhausts through the pipe 69, the pipe 108 into the valve 81, through a central bore in the valve member 88, through the pipe 107, the throttle valve 105, the pipe 96, through the valve 80 and exhausts through the pipe 103 into the reservoir 77. By adjustment of the throttle valve 105, the rate of infeeding movement of the grinding wheel may be readily controlled.

It is desirable to provide an initial rapid infeed feeding movement of the wheel slide 30 so as to take up backlash in the feeding mechanism. This is accomplished by means of the backlash control valve 99. Fluid under pressure in the pipe 109 passes into the left hand end chamber 102 of the backlash valve 99 to shift the valve toward the right (Fig. 3). During movement of the valve 99 toward the right, fluid within the right hand end chamber 98 exhausts through the throttle valve 97, the pipe 96, through the valve 80 and exhausts through the pipe 103 into the reservoir 77. By adjustment of the throttle valve 97, the rate of movement of the backlash valve 99 may be adjusted. During movement of the valve 99 toward the right, the valve chamber 100 passes across the pipe 69 and allows a predetermined quantity of fluid to be metered through the valve chamber 100 directly into the exhaust pipe 103. Fluid passing through the valve chamber 100 bypasses the throttle valve 105 and allows a rapid movement of the wheel feed mechanism parts to take up any backlash in the mechanism after which the throttle valve 105 controls the rate of movement of the wheel slide 30 during a grinding operation.

During the infeeding movement of the grinding wheel 32, movement of the piston 161 serves to actuate the Selsyn generator 305 so as to cause a continuously diminishing speed of the work driving motor 290, as above described.

During a cam grinding operation, the rock bar 20 is rocked by rotation of the master cam 116 in engagement with the master cam roller 117. During each oscillation of the rock bar 20, the limit switch LS5 is actuated by an arm 446 to impart an impulse to the electric counter 366. After a predetermined number of impulses the counter counts out closing RC1 and LC1 (Fig. 4). At the count out, the limit switch LS3 is open and the contacts LC1 of the counter 366 previously has been closed so the solenoid S4 is energized even though the limit switch LS3 opened as the index dog 247 on the table 11 engaged and moved the plunger 248 downwardly. At count out of the counter 366, contacts LC1 open and the solenoid S4 is deenergized which serves to shift the pilot valve 236 to admit fluid under pressure to the right hand end chamber of the valve 234 to shift the valve member 235 toward the left. In this position of the valve 234, fluid in the pipe 78 passes through a chamber in the valve 234, through the pipe 232, the valve 230, through the pipe 255 into the cylinder chamber 256 to move the piston 246 downwardly against the compression of the spring 244 to move the plunger 252 downwardly out of the path of the index dog 247 so that the table 11 is free to move toward the right. The solenoid S1 is deenergized during the entire grinding cycle. During the downward movement of the plunger 252, the limit switch LS6 is opened to deenergize the solenoid S3. Opening of limit switch LS6 serves to deenergize relay switch CR4, thus opening a circuit to deenergize the solenoid S8. With solenoid S8 deenergized, fluid under pressure from the reversing valve 182, passes through the pipe 190, the pipe 90, through the pilot valve 89 into the right hand end chamber of the valve 81 to shift the valve member 88 toward the left (Fig. 3). With valves 80 and 81 positioned as shown in Fig. 3, fluid under pressure from the pump 75 passes through the pipe 78, through the valve 80, the pipe 96, through both the throttle valve 105 and the ball check valve 106, the pipe 107, into the valve 81, through the central bore in the valve member 88, the pipe 108, the ball check valve 110 into the cylinder chamber 68 to move the piston 61 toward the left (Figs. 3 and 6) so as to cause a rapid rearward movement of the grinding wheel 32 and the wheel slide 30 to an inoperative position. Fluid under pressure in the pipe 96 also passes through the ball check valve 104 to shift the backlash valve 99 toward the left into its initial position. Fluid under pressure in the pipe 96 also passes through the pipe 157, the throttle valve 167, into the cylinder chamber 166 to move the piston 161 toward the left (Fig. 3) thereby returning the Selsyn generator 305 to its initial position so as to increase the speed of the work drive motor 291 to its initial speed.

When the rock bar 20 is rocked in a clockwise direction (Fig. 5) to an inoperative position after a grinding operation, an arm 447 closes the limit switch LS4 to energize the solenoid S2 to shift the valve 200 so that fluid under pressure may again pass into the cylinder chamber 199 to move the cylinder 16 toward the right to index the table into position for grinding the next cam to be ground. As the index dog 247 moves off the plunger 248, the release compression of a spring 448 (Fig. 9) raises the plunger 248 and closes the limit switch LS3 so as to energize the solenoid S4. Energizing of solenoid S4 serves to shift the pilot valve 236 so as to admit fluid to the left hand end chamber of the valve 234 to shift the valve member 235 toward the right into the position illustrated in Fig. 3. In this position of the valve 234, the released compression of the spring 244 raises the piston 246 and the plunger 252 upwardly. Fluid within the cylinder chamber 256 may exhaust through the pipe 255, the valve 230, the pipe 232, the valve 234, the pipe 195, the pipe 226, the reversing valve 182 and through exhaust pipe 258 into the reservoir 77. The above cycle is then repeated for grinding the next and succeeding cams on the camshaft being ground.

After the last cam on the camshaft has been ground, the table 11 moves toward the right until the reversing dog 186 engages the lug 183 on the reversing lever 175 and rocks it in a clockwise direction (Fig. 8) so as to shift the reversing valve 182 into a reverse position to change the direction of movement of the table 11 to traverse it through an idle stroke toward the left. Shifting of reverse valve 182 serves to pass fluid under pressure through the pipe 195 into end chamber 194 so as to shift valve member 193 toward the right (Fig. 3) thereby reversing the flow of fluid to and from the table cylinder 16. During movement of the cylinder 16 toward the left, fluid within the cylinder chamber 199 exhausts through the pipe 198, the valve 192, the pipe 210, the valve 201 (Fig. 3), the pipe 219. Some of the fluid in the pipe 219 passes through the throttle valve 220 and the remainder exhausts through the valve 239, through the throttle valve 242, through the relief valve 222 into the reservoir 77. Valve 239 is held open by pilot pressure from pipe 226 of reversing valve 182.

When the table 11 reverses, the pipe 226 conveys fluid under pressure from the reversing valve 182, through the pipe 195 to the valve 234. Solenoid S4 is energized since limit switch LS3 is closed, so that fluid under pressure in the pipe 226 passes through the pipe 195, through the valve 234, the pipe 232, the valve 230, through the pipe 255 into the cylinder chamber 256 to move the piston 246 and to move the plungers 252 and 248 downwardly out of the path of movement of the index dogs 247 during the idle return movement of the table 11 toward the left (Figs. 3 and 7). The upper end of the plunger 252 is provided with a transversely extending clearance slot through which the lower ends index dogs 247 and the truing dog 450 described may pass during table index movements and also during the return stroke of the table 11. After the last cam on the camshaft has been ground and the table is reversed for an idle return stroke, the rock bar 20 is rocked to an inoperative position with the piston 136 held by fluid under pressure against the end of the cylinder 135 where it remains during the idle stroke of the table and also during an automatic truing operation. At the same time the feed wheel 46 automatically is rotated to bring the stop abutment 50 into engagement with the stop pawl 48 so as to locate the grinding wheel 32 in a forward or final grinding position for a truing operation as will be more fully described hereinafter.

When the reversing valve 182 is shifted into the reverse position by reversing dog 186 at the right hand end of the stroke of the table 11 to pass fluid under pressure through the pipe 226, fluid passes through the pipe 195, the pipe 267 to the feed compensator unit 59 previously described (Figs. 23 and 24) to impart a rotary motion to the feed nut 51 (Fig. 2) automatically to advance the wheel slide for the first pass of the truing tool 435 across the operative face of the grinding wheel 32.

When the table 11 is reversed at the right hand end of its stroke, downward movement of the plunger 252, as above described, serves to open the limit switch LS6 so as to deenergize the solenoid S2 to shift the valve member 82 into the position illustrated in Fig. 3. Pilot pressure in the pipe 226 enters the left hand end chamber of the valve 81 to shift the valve member 88 toward the right. In this position of the valves 80 and 81, fluid under pressure in the pipe 78 passes through the valve 80, the pipe 96, the ball check valve 106, the pipe 107, through the valve 81, the pipe 66, into the cylinder chamber 67 to move the feed piston 61 toward the right so as to rotate the feed wheel 46 in a counterclockwise direction to bring the stop abutment 50 into engagement with the stop pawl 48 thereby advancing the wheel slide 30 and the grinding wheel 32 into a finish grinding position before a truing operation. As previously explained, the feed compensator unit 59 has rotated the feed nut 51 to advance the face of the grinding wheel a desired amount before the truing operation. By truing the grinding wheel 32 in a final grinding position, grinding may be resumed after a truing operation without the necessity of a further adjustment of the feed mechanism.

As table 11 moves to the left, the table dog 286 engages and depresses the plunger 280 so as to close the open contacts of the limit switch LS1 thereby energizing the solenoid S1 to shift the valve 230 into the left hand end position as illustrated in Fig. 3. In this position of the valve 230, fluid within the cylinder chamber 256 may be exhausted under the influence of the released compression of the spring 244 so as to raise the plunger 252. Truing dog 450 engages and depresses the plunger 248 which serves to open the limit switch LS3 to deenergize the solenoid S4 to shift the valve member 235 toward the left. Fluid under pressure may then pass from the pipe 78 through the valve 234, the pipe 232, the valve 230, the pipe 228, the pipe 262 into the cylinder chamber 260 to move the piston 263 toward the right (Fig. 3) so as to stop the grinding wheel spindle reciprocation during a wheel truing operation.

Depressing the plunger 248 by action of the truing dog 450 also serves to close the limit switch LS6 which serves to energize the solenoid S7. Energizing of solenoid S7 serves to shift the valve member 215 toward the right so that fluid exhausting from the table cylinder 16 passing through the pipe 210 passes through the valve 201 and through the pipe 224. Since the check valve 227 is held closed by fluid under pressure within the pipe 226, fluid exhausting through the pipe 224 may exhaust only through the truing speed control throttle valve 225 into the reservoir 77. It will be readily apparent from the foregoing disclosure that by adjustment of the throttle valve 225 a predetermined slow truing speed of the table 11 may be obtained.

The table 11 traversing at a slow truing speed, toward the left, traverses the truing tool 435 across the operative face of the grinding wheel 32 to true the same.

Slow movement of the table 11 toward the left continues until the table reversing dog 185 engages the lug 184 and rocks the reversing lever 175 in a counter-clockwise direction into the position illustrated in Fig. 8. This movement of the reversing lever 175 serves to shift the reversing valve 182 into the position illustrated in Fig. 3 so as to reverse the flow of fluid under pressure to the table cylinder 16 to start movement of the table 11 toward the right. At the same time, fluid under pressure is passed through the pipe 268 to actuate the truing feed compensator 59 so as to rotate the feed nut 51 to advance the grinding wheel 32 before the second pass of the truing tool 435 across the wheel. By adjustment of the compensator unit, as above described, the infeed of the grinding wheel before each pass of the truing tool may be independently varied as desired.

After the second pass of the truing tool 435 across the face of the grinding wheel 32, the table 11 continues moving toward the right at a slow truing speed until the loading dog 303 engages the lug 302 and rocks the main control lever 275 in a clockwise direction (Fig. 8) to open the limit switch LS7. Opening of limit switch LS7 serves to deenergize the solenoid S2 to shift the valve member 202 into the left hand end position (Fig. 3) in which position fluid under pressure is cut off from the table cylinder 16 and the table 11 is stopped in a loading position.

During movement of the table 11 toward the left, the cam 320 engages and raises the lug 302 and the main control lever 275 against the compression of the spring 274. After the lug 302 rides over the cam 320, the released compression of the spring moves the lever 275 and the lug 302 downwardly so that when the table moves toward the right, after a truing operation, the lug 302 will engage the vertical end face on the cam 320 to shift the main control lever 275 and thereby stop the table 11 in a loading position. The camshaft which has been ground may then be removed from the machine and a new camshaft to be ground inserted thereinstead. After a new camshaft has been mounted in the machine, it is merely necessary to raise the main control lever 275 and then to shift it toward the right to start the next grinding cycle on the next shaft to be ground. It is not necessary to actuate the cycle control lever 270 on successive grinding operations since the electric control circuits are rendered operative by the initial closing. It is only necessary to actuate the cycle control lever 270 after the main switch has been thrown, when it is desired to again start the machine in operation.

It may be desirable at times to regrind certain cams on a camshaft after the shaft has previously been completely ground to improve the surface of an individual cam or cams if desired. Assuming the machine is in a loading position after the complete camshaft has been ground, the main control lever 275 is raised and shifted toward the right to start the table moving toward the right. The cycle control lever 270 is then actuated to open the cycle stop switch 273 (Fig. 3). Opening the switch 273 serves to deenergize the switch CR1 which in turn serves to deenergize the switch CR3. Deenergizing switch CR3 breaks a circuit to deenergize the solenoid S4 so as to shift the valve member 235 toward the left. With the valve member 235 in a left hand end position, fluid under pressure in the pipe 78 passes through the valve 234, the pipe 232, through the valve 230, the pipe 255 into the cylinder chamber 256 so as to cause a downward movement of the piston 246. The downward movement of the piston 246 against the compression of the spring 242 serves to move the plunger 252 downwardly out of the path of the table index dogs 247 and to hold the plunger 252 in a downward position until the cycle control lever 270 is again actuated. As the table 11 moves so that the cam to be reground approaches an operative position opposite the grinding wheel 32, the cycle control lever 270 is actuated to close the cycle start switch 272 so that fluid may exhaust from the cylinder chamber 256 thereby releasing the compression of the spring 242 so as to move the plunger 252 upwardly into the path of the next table index dog 247. The table 11 is then slowed down and stopped in a predetermined indexed position for regrinding the surface of a cam. The grinding cycle then proceeds automatically. The rock bar moves into an operative position with the master cam 116 in engagement with the master cam roller 117 and the feed piston 61 moves toward the right (Fig. 6) to move the wheel forward into a final grinding position. If it is desired to advance the wheel to remove further stock from the cam, this may be accomplished either by manual manipulation of the micrometer feed adjustment 47 or by declutching the feed piston 61 from the feed screw 35. After the cam has been reground to the desired extent, the grinding wheel automatically backs off and the table 11 will automatically index to the next cam unless the operator again actuates the cycle control lever so as to open the cycle stop switch 273. It will be readily apparent from the foregoing disclosure that by manipulation of the cycle control lever 270 and the table reverse lever 175, the table 11 may be indexed to regrind any cam on a camshaft desired.

It may be desirable at times to operate the automatic cam grinding machine under manual control for setting up, or grinding a single camshaft to a special size. This may be accomplished by actuating the clutch lever 480 to disconnect the clutch parts 493—494 so that the grinding wheel 32 may be manually controlled by the feed wheel 46. The selector switch 367 is turned to an "off" position so as to render the electric counter 366 inoperative. The cycle control lever 270 may then be actuated to close the cycle start switch 272. The main control lever 275 is then raised and moved toward the right to start the table moving toward the right. When the first table index dog 247 engages and actuates the plunger 248, the table 11 will be slowed down and stopped opposite the first cam to be ground. The grinding wheel 32 may then be fed toward the cam to be ground to grind the same to the desired size and contour. After the cam has been ground to the desired size, the feed wheel 46 is rotated manually in the opposite direction to back off the grinding wheel 32 after which the table indexes into position for grinding the next cam. If it is desired to jog the work being ground, the stop button 471 may be actuated a sufficient distance to close the jog switch 327 which serves to energize the switch MH to start the work drive motor 291. The motor 291 is rotated only while the jog switch 327 remains closed. This jogging provision enables the operator to inspect the cam being ground and also facilitates jogging of the work piece in setting up the grinding machine.

When the machine is under manual control and it is desired to provide a continuous rotation of the camshaft being ground during the entire cycle of operation, the actuation of the start switch 470 establishes a parallel holding circuit through relay switch CR5 to hold relay switch CR2 energized independent of the limit switch LS8. Maintaining relay CR2 energized serves to maintain the relay switch MH energized so that the work drive motor 291 is rotated continuously. By maintaining relay switch CR2 energized through the parallel holding circuit, relay switch MH remains energized even though the limit switch LS2 is opened by the high point of the cam 473 when the rock bar is rocked to an inoperative position between grinding operations on successive cams. The motor 291 operates continuously until the stop switch 471 is manually actuated to break the circuit and thereby stop the motor 291.

It will thus be seen that there has been provided by this invention apparatus in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the acompanying drawings is to be interpreted as illustrative and not in a limiting sense.

We claim:

1. In a cam grinding machine having a longitudinally movable table, a piston and cylinder to move said table, a reversing valve therefor, a solenoid-actuated valve to control the admission to said cylinder, a second solenoid-actuated valve to control the exhaust of fluid from said cylinder, a rotatable grinding wheel, a transversely movable slide therefor, means including a piston and cylinder to feed said slide, a third solenoid-actuated control valve therefor, a pivotally mounted rock bar on said table, a rotatable work support including a master cam spindle having a plurality of master cams thereon mounted on said rock bar, a follower roller associated therewith to oscillate said rock bar, means including a piston and cylinder to rock said bar to and from an operative position, an electric counter actuated by oscillation of the rock bar, means including an electric motor to rotate the master cam spindle and the cam shaft to be ground, and a table indexing control means including a plurality of table index dogs, a movable stop plunger associated therewith, yieldable means normally to maintain said plunger in the path of said dogs, a piston and cylinder automatically to withdraw said plunger to an inoperative position after each cam has been ground, and a fourth solenoid valve actuated by said counter to control the admission of fluid to said cylinder so as to withdraw said plunger and thereby start an indexing movement of the table.

2. In a grinding machine as claimed in claim 1, in combination with the parts and features therein specified in which one of said solenoid actuated control valves serves to control the admission of fluid to the table index cylinder and the second of said solenoid actuated control valves to control the exhaust of fluid from the table index cylinder, an adjustable throttle valve to control the exhaust of fluid from said second solenoid-actuated valve to slow down the indexing movement of the table, an adjustable truing speed valve to control the exhaust of fluid from said second valve to produce a predetermined truing speed of the table, an exhaust line operative in one position of said second solenoid-actuated valve to allow substantially unrestricted exhaust of fluid from the table cylinder during an indexing or an idle stroke thereof, and a limit switch actuated by the table index plunger to energize said second solenoid-actuated valve to slow down the indexing speed of the table before it reaches an indexed position.

3. In a cam grinding machine as claimed in claim 1, in combination with the parts and features therein specified in which the first solenoid actuated control valves serves to control the admission of fluid to the table index cylinder and the second of said solenoid actuated control valves to control the exhaust of fluid from the table index cylinder, an adjustable throttle valve to control the exhaust of fluid from the second solenoid-actuated valve to slow down the indexing movement of the table, an adjustable truing speed valve to control the exhaust of fluid from the second solenoid-actuated valve to produce a predetermined truing speed of the table, an exhaust line operative in one position of said second solenoid-actuated valve to allow substantially unrestricted exhaust of fluid from the table cylinder during an indexing or an idle stroke thereof, a limit switch actuated by the table index plunger to energize said second solenoid-actuated valve so as to slow down the indexing speed of the table when the table approaches an indexed position, and a pressure actuated check valve to render the adjustable throttle valve inoperative during a grinding wheel truing operation.

4. In a cam grinding machine as claimed in claim 1, in combination with the parts and features therein specified in which the first of said solenoid actuated control valves serves to control the admission of fluid to the table index cylinder and the second solenoid actuated control valve serves to control the exhaust of fluid from the table index cylinder, an adjustable throttle valve to control the exhaust of fluid from the second solenoid-actuated valve to slow down the indexing movement of the table, an adjustable truing speed valve to control the exhaust of fluid from the second valve to produce a predetermined truing speed of the table, an exhaust line operative in one position of the second solenoid actuated valve to allow substantially unrestricted exhaust of fluid from the table cylinder during an indexing or an idle stroke thereof, a limit switch actuated by the table index plunger to energize said second solenoid-actuated valve to slow down the indexing speed of the table, a pressure actuated check valve to render the adjustable throttle valve inoperative during a grinding wheel truing wheel operation, and a limit switch actuated by movement of the rock bar to an inoperative position to energize the first solenoid actuated valve to admit fluid under pressure to the table index cylinder.

5. In a cam grinding machine as claimed in claim 1, in combination with the parts and features therein specified of a wheel spindle reciprocating mechanism, a piston and cylinder to render said mechanism inoperative, said fourth solenoid-actuated valve when energized serving to admit fluid to the index plunger cylinder, a pressure actuated check valve to render the adjustable throttle valve inoperative during a truing operation, and a limit switch actuated by movement of the table toward a truing position to energize said valve so as to admit fluid under pressure to the reciprocating mechanism cylinder to stop wheel spindle reciprocation and simultaneously to admit fluid under pressure to hold the check valve closed so that fluid exhausting from the table cylinder exhausts through the truing speed valve to produce a predetermined slow truing speed of the table.

6. In a cam grinding machine as claimed in claim 1, in combination with the parts and features therein specified of a truing tool mounted on said rock bar, means including a reversing lever to actuate said reversing valve to reverse the direction of movement of the table at the ends of its stroke, a feed compensator actuated in timed relation with the table reversal to advance the grinding wheel for a truing operation, means including a table dog to slow down the table as it approaches a truing position to a predetermined slow truing speed, means including a main control lever to facilitate starting an automatic grinding cycle, and means including a loading dog to shift said main control lever to a stop position after one complete reciprocation of the truing tool relative to the grinding wheel.

7. In a cam grinding machine as claimed in claim 1, in combination with the parts and features therein specified of a truing tool mounted on said rock bar, means including a reversing lever to actuate said reversing valve to reverse the direction of movement of the table, a feed compensator actuated in timed relation with the table reversal to advance the grinding wheel for a truing operation, means including a table dog to slow down the table as it approaches a truing position to a predetermined slow speed, and means including a latch on said reversing lever which is arranged to be swung to and from an operative position to facilitate a continuous reciprocation of the truing tool when desired, said latch when in an operative position serving to actuate the reverse lever at one end of the stroke of the truing tool across the face of the grinding wheel.

8. In a cam grinding machine as claimed in claim 1, in combination with the parts and features therein specified of a truing tool on said rock bar, means including a reversing lever to actuate said reversing valve to reverse the direction of movement of the table, a feed compensator actuated in timed relation with the table reversal to advance the grinding wheel for a truing operation, means including a normally operative truing dog to slow down the movement of the table as it approaches a truing position to a predetermined slow truing speed, and means to raise the truing dog to an inoperative position to facilitate an automatic cycle of operation without truing.

9. In a cam grinding machine as claimed in claim 1, in combination with the parts and features therein specified in which said fourth solenoid valve is energized during grinding so that the plunger cylinder is open to exhaust, an electric counter to control the duration of the grinding operation, said counter serving at count-out to deenergize said solenoid valve thereby admitting fluid under pressure to the plunger cylinder so as to withdraw said plunger, and means including a limit switch actuated by said plunger to actuate the third solenoid-actuated valve so as to cause a rearward movement of the grinding wheel and to cause the rock bar to rock to an inoperative position.

10. In a cam grinding machine as claimed in claim 1 in combination with the parts and features therein specified of another solenoid-actuated control valve to control the admission to and exhaust of fluid from the fourth solenoid valve, said latter valve being energized during grinding so that the plunger cylinder is open to exhaust, an electric counter to control the duration of the grinding operation, means including a limit switch actuated by oscillation of the rock bar during a grinding operation to actuate said counter, said counter at count-out serving to deenergize the latter solenoid valve thereby to admit fluid under pressure to the plunger cylinder so as to withdraw the plunger to an inoperative position, and means including a limit switch actuated by said table when it approaches a truing position to energize the first solenoid valve to slow down the table to a predetermined truing speed.

11. In a cam grinding machine having a longitudinally movable table, a piston and cylinder to move said table, a shuttle-type reversing valve therefor, a solenoid-actuated control valve for controlling the admission of fluid to said shuttle valve and cylinder, a second solenoid-actuated valve to control the exhaust of fluid from said shuttle valve and cylinder, a rotatable grinding wheel, a transversely movable slide therefor, a nut and screw to move said slide, a manually operable feed wheel including an adjustable stop abutment and a stop pawl, means including a piston and cylinder to rotate said feed screw and feed wheel, a solenoid-actuated control valve therefor, a pivotally mounted rock bar on said table, a rotatable work support on said rock bar including a master cam spindle, means including a plurality of master cams and a follower to oscillate said rock bar, means including a piston and cylinder to rock said bar to and from an operative position, a variable speed electric motor to rotate the master cam spindle and cam shaft to be ground, means including a Selsyn generator to control the speed of said motor, means including a piston and cylinder to actuate the Selsyn rotor so as to produce a continuously changing work speed, and a table indexing means including table index dogs and a movable stop plunger, a spring normally to maintain said plunger in the path of said index dogs, a piston and cylinder to withdraw said plunger to an inoperative position, and a solenoid actuated valve to control the admission of fluid to said latter cylinder to facilitate indexing said table.

12. In a cam grinding machine having a longitudinally movable table, a piston and cylinder to move said table, a shuttle type reversing valve therefor, a solenoid-actuated control valve for controlling the admission of fluid to said shuttle valve and cylinder, a solenoid-actuated valve to control the exhaust of fluid from said shuttle valve and cylinder, a rotatable grinding wheel, a transversely movable slide therefor, means including a piston and cylinder to move said slide, a solenoid-actuated control valve therefor, a pivotally mounted rock bar on said table, a rotatable work support on said rock bar including a master cam spindle, means including a plurality of master cams on said spindle and a follower to oscillate said rock bar so as to generate cams of a predetermined contour, means including a piston and cylinder to rock said bar to and from an operative position, an electric motor to rotate the master cam spindle and camshaft to be ground, and a table indexing means including table index dogs and a movable stop plunger to control the indexing movement of said table, a spring normally to maintain said plunger in the path of said index dogs, a piston and cylinder to withdraw said plunger to an inoperative position, and a solenoid-actuated valve to control the admission of fluid to said latter cylinder to control withdrawal of said plunger so as to initiate an indexing movement of the table.

13. In a cam grinding machine having a longitudinally movable table, a piston and cylinder to move said table, a reversing valve therefor, a control valve for controlling the admission of fluid to said reversing valve and cylinder, a second control valve and cylinder, a rotatable grinding wheel, a transversely movable slide therefor, means including a piston and cylinder to move said slide, a control valve therefor, a pivotally mounted rock bar on said table, a rotatable work support on said rock bar including a master cam spindle, means including a plurality of master cams on said spindle and a follower to oscillate said rock bar to generate cams of a predetermined contour, means including a piston and cylinder to rock said bar to and from an operative position during table indexing movements, an electric motor to rotate the master cam spindle and the cam shaft to be ground, and a table indexing means including table index dogs and a movable stop plunger, yieldable means normally to maintain said plunger in the path of said index dogs, a piston and cylinder to withdraw said plunger to an inoperative position, and a control valve to control the admission of fluid to said plunger cylinder so as to withdraw said plunger and thereby initiate an indexing movement of the table.

14. In a cam grinding machine as claimed in claim 13, in combination with the parts and features therein specified of means including a Selsyn generator to control the speed of the camshaft driving motor, a solenoid actuated control valve simultaneously to control the admission to and exhaust of fluid from the rock bar cylinder, the Selsyn rotor cylinder and the wheel feed cylinder simultaneously to move the rock bar to an operative position, to start movement of the Selsyn rotor to produce a continuously changing work speed, and to the feed cylinder to initiate an infeeding movement of the grinding wheel, and means including a limit switch actuated by the table index plunger to actuate said control valve to start a grinding cycle.

15. In a cam grinding machine as claimed in claim 13, in combination with the parts and features therein specified of means including a Selsyn generator to control the speed of the camshaft driving motor, a solenoid actuated control valve simultaneously to control the admission to and exhaust of fluid from the rock bar cylinder, the Selsyn rotor cylinder and the wheel feed cylinder simultaneously to move the rock bar to an inoperative position, to return the Selsyn rotor to its initial position, and to the feed cylinder to initiate a rearward movement of the grinding wheel, and means including a limit switch actuated by the table index plunger to actuate said control valve to terminate a grinding cycle after a cam has been ground to a predetermined size.

16. In a cam grinding machine as claimed in claim 13, in combination with the parts and features therein specified of a nut and screw feed mechanism for the wheel slide, means to rotate said screw to feed said slide, feed compensator including a piston and cylinder, a pawl and ratchet actuated thereby, operative connections between said pawl and ratchet and the feed nut to rotate the feed nut independently to advance the grinding wheel for a grinding wheel truing operation, and fluid connections between the opposite ends of the shuttle type reversing valve and the feed compensator to advance the grinding wheel a predetermined amount during each actuation of the reversing valve at each end of the table movement.

17. In a cam grinding machine as claimed in claim 13, in combination with the parts and features therein specified of a feed nut and screw feed mechanism for the wheel slide, means to rotate said screw to feed said slide, compensator including a piston and cylinder, a pawl and ratchet actuated thereby, operative connections between said pawl and ratchet and the feed nut to rotate the feed nut independently to advance the grinding wheel for a truing operation, fluid connections between opposite ends of the shuttle type reversing valve and the feed compensator to advance the grinding wheel a predetermined amount during each actuation of the reversing valve, and a table actuated reversing valve to control actuation of the shuttle type reversing valve at each end of the table.

18. In a cam grinding machine as claimed in claim 13, in combination with the parts and features therein specified of means including a Selsyn generator to control the speed of the camshaft driving motor, adjustable actuating connections between the piston and the Selsyn rotor to vary the movement of said rotor, and a throttle valve at each end of the rotor actuating cylinder to control the rate of movement of the piston, said throttle valve serving to facilitate locking the piston and Selsyn generator rotor in any desired position in case a constant speed of the work drive motor is desired.

19. In a cam grinding machine as claimed in claim 13, in combination with the parts and features therein specified of means including a Selsyn generator to control the speed of the camshaft driving motor, a series of electrical control circuits for said solenoid-actuated valves, a cycle control lever, a start and stop switch actuated thereby to render the control circuits operative or inoperative, a main control lever, a limit switch actuated thereby to start an automatic cycle, said limit switch serving to close a circuit so as to energize the table control solenoid-actuated valve to admit fluid under pressure to the table cylinder so as to index the table to the first grinding position, a second limit switch actuated by movement of the index plunger to slow down the table before the index dog engages the stop plunger, a solenoid-actuated control valve simultaneously to control the admission to and exhaust of fluid from the rock bar cylinder, the Selsyn rotor actuating cylinder, and the feed control valve and cylinder, said second limit switch serving also to energize the latter valve to move the rock bar to an operative position, to start movement of the Selsyn rotor so as to provide a diminishing speed of the work, and to start an infeeding movement of the grinding wheel after each table indexing movement to initiate a cam grinding cycle.

20. In a cam grinding machine as claimed in claim 13, in combination with the parts and features therein specified of an electric counter operatively connected to control the duration of a grinding operation, means including a limit switch actuated by oscillation of the rock bar to actuate the counter, said counter serving at count-out to terminate the grinding operation, a manually operable selector switch to render said counter operative or inoperative, and a manually operable start and stop switch which is connected through a parallel holding circuit to facilitate manual control of the work rotation to facilitate a manual rotation of the work rotation when desired.

21. In a cam grinding machine as claimed in claim 13, in combination with the parts and features therein specified of an electric counter operatively connected to control the duration of a grinding operation, means including a limit switch actuated by oscillation of the rock bar to actuate the counter, said counter at count-out serving to terminate the grinding operation, a limit switch actuated by movement of the rock bar to and from an operative position to start and stop the work drive motor, a manually operable selector switch to render said counter operative or inoperative, a manually operable start and stop switch for starting and stopping the work drive motor to provide a continuous rotation of the work motor when desired, and a parallel holding circuit which is operative when the manual switch is actuated to render the rock bar switch inoperative to facilitate a manual control of the work rotation when desired.

22. In a cam grinding machine as claimed in claim 13, in combination with the parts and features therein specified in which one of the solenoid-actuated control valves serves to control the exhaust of fluid from the table cylinder, an adjustable throttle valve to control the exhaust of fluid from the control valve to control the normal indexing speed of the table, an adjustable throttle valve to control the exhaust of fluid from said valve to slow down the indexing movement of the table, an adjustable truing speed valve to control the exhaust of fluid from said control valve to produce a predetermined slow truing speed of the table, and a normally closed pressure actuated valve which is opened by pilot pressure from the table reversing valve so as to provide a rapid idle stroke of the table.

23. In a cam grinding machine having a longitudinally movable table, a rock bar on said table, a rotatable work support including a master cam spindle having a plurality of master cams thereon, a follower roller associated therewith, means including an electric motor to rotate said master cam spindle and the camshaft to be ground, a rotatable grinding wheel, a transversely movable slide for said wheel, an independent piston and cylinder for moving said table, rock bar, and wheel slide, a table index mechanism including a plurality of adjustable table index dogs a movable plunger associated with said dogs, means including a limit switch actuated by said plunger to move said rock bar to an operative position and to start an infeeding movement of the grinding wheel, and means including a limit switch actuated by movement of the rock bar to an operative position to start the work drive motor.

24. In a cam grinding machine having a longitudinally movable table, a rock bar on said table, a rotatable work support including a master cam spindle having a plurality of master cams thereon which is mounted on said rock bar, a follower roller associated therewith, means including a variable speed electric motor to rotate said master cam spindle and the camshaft to be ground, means including a Selysn generator to control the speed of said motor, said Selsyn generator having a movable rotor a rotatable grinding wheel, a transversely movable slide for said wheel, an independent fluid motor for moving said table, said rock bar, said Selsyn rotor, and said wheel slide, a table index mechanism including a plurality of adjustable index dogs and a movable plunger, means including a limit switch actuated by said plunger to move said rock bar to an operative position, to start an infeeding movement of the grinding wheel, and to move said Selsyn rotor to produce a gradually diminishing work speed during the grinding operation, and means including a limit switch actuated by movement of the rock bar to an operative position to start the work drive motor.

25. In a grinding machine having a longitudinally movable table, a rock bar on said table, a master cam spindle thereon, a plurality of master cams on said spindle, a master cam follower roller, an index mechanism to index said table longitudinally, an index mechanism actuated by the indexing movement of the table automatically to index the master cam follower roller relative to the master cams, means including a piston and cylinder to move the rock bar to and from an operative position, an arm on said rock bar, and a tension spring connecting the piston with said arm, said spring being arranged to move bodily with the piston until a master cam engages the follower roller after which continued movement of the piston serves to increase the tension of the spring to the desired operating tension.

26. In a cam grinding machine having a longitudinally movable table, a rock bar on said table, a master cam spindle thereon, a plurality of master cams on said spindle, a master cam follower roller, an index mechanism to index the table longitudinally, an indexing mechanism actuated by the indexing movement of said table automatically to index the master cam roller relative to said master cams, means including a piston and cylinder to move the rock bar to and from an operative position, an arm on said rock bar, said piston being arranged to separate the cam being ground a sufficient distance from the grinding wheel to facilitate a table indexing movement, tension springs connecting the piston with said arm, said springs being arranged to move bodily with the piston until a master cam engages the follower roller after which continued movement of the piston serves to increase the tension of the springs, and an adjustable stop to limit the movement of the piston in one direction so as to limit the tensioning of said springs.

27. In a cam grinding machine having a rock bar, a master cam spindle thereon, a plurality of master cams on said spindle, a master cam follower roller, means including a piston and cylinder to move the rock bar to and from an operative position, a substantially U-shaped frame movable with said piston, an arm on said rock bar, tension springs interposed between the U-shaped frame and the arm, and rollers on said arm to engage said frame during movement of the rock bar to an inoperative position, said frame being arranged to move away from said rollers when moved toward an operative position as the master cam engages the follower roller after which continued movement of the piston and frame serves to increase the tension of said springs.

CLARENCE J. GREEN.
OIVA E. HILL.

REFERENCES CITED

The following references are of record in the file of this patent:

UNITED STATES PATENTS

| Number | Name | Date |
|---|---|---|
| 2,015,414 | Steiner et al. | Sept. 24, 1935 |
| 2,022,178 | Belden et al. | Nov. 26, 1935 |
| 2,078,463 | Silven | Apr. 27, 1937 |
| 2,243,410 | Balsiger et al. | May 27, 1941 |
| 2,284,606 | Flygare et al. | May 26, 1942 |
| 2,328,251 | Balsiger | Aug. 31, 1943 |
| 2,448,283 | Silven | Aug. 31, 1948 |
| 2,460,744 | Green | Feb. 1, 1949 |